(12) United States Patent
Tsuzuki

(10) Patent No.: US 6,281,924 B1
(45) Date of Patent: Aug. 28, 2001

(54) IMAGE FORMING METHOD

(75) Inventor: Toru Tsuzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/295,307

(22) Filed: Apr. 21, 1999

(30) Foreign Application Priority Data

Apr. 22, 1998 (JP) .................................................. 10-112256

(51) Int. Cl.[7] .................................................. B41J 2/47
(52) U.S. Cl. .................................................. 347/251; 347/240
(58) Field of Search .................................................. 347/240, 251; 358/515, 521, 533, 534, 535, 536, 456, 457

(56) References Cited

U.S. PATENT DOCUMENTS

| | | | |
|---|---|---|---|
| 4,903,123 | * 2/1990 | Kawamura et al. | 358/533 |
| 5,166,809 | * 11/1992 | Surbrook | 358/456 |
| 5,640,654 | 6/1997 | Yoshizawa | 399/227 |
| 5,724,633 | 3/1998 | Amemiya | 399/223 |

* cited by examiner

Primary Examiner—N. Le
Assistant Examiner—Hai C. Pham
(74) Attorney, Agent, or Firm—Oliff & Berridge, PLC

(57) ABSTRACT

Image patterns formed on a sheet of paper changes in correspondence with an input image density. As the input density increases, the image patterns change from the state of FIG. 6(a) through the state of FIG. 6(b)–6(g) to the state of FIG. 6(h). As apparent from the drawings, as the input density increases, the linear patterns will extend in a direction parallel to the sheet conveying direction A. Even when mechanical oscillation occurs in the sheet conveying direction A, no changes in tone will appear. When the input density further increases from the state of FIG. 6(d), the linear patterns will grow both in leftward and rightward directions. Because each dither matrix is elongated in the sheet conveying direction A, the linear patterns will grow in the leftward and rightward directions only after the input density increases to some great value. It is therefore possible to effectively prevent occurrence of jitter.

45 Claims, 26 Drawing Sheets

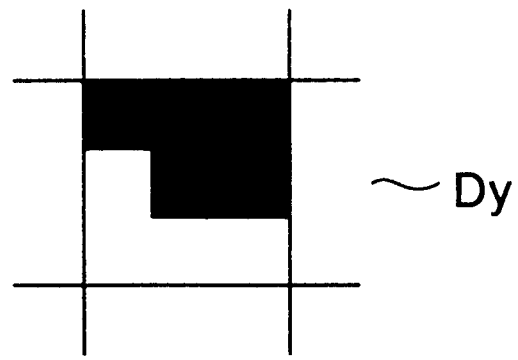
FIG.10(d) ~Dy
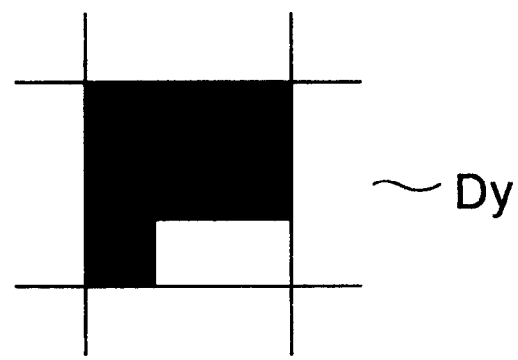
FIG.10(e) ~Dy
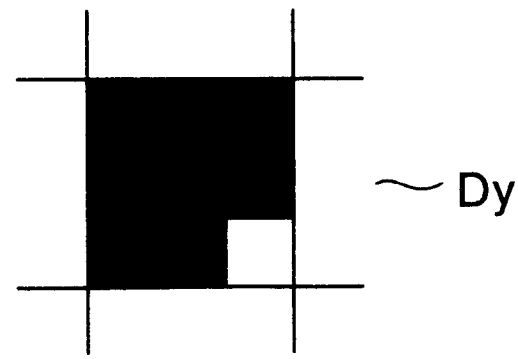
FIG.10(f) ~Dy

FIG.12(b)

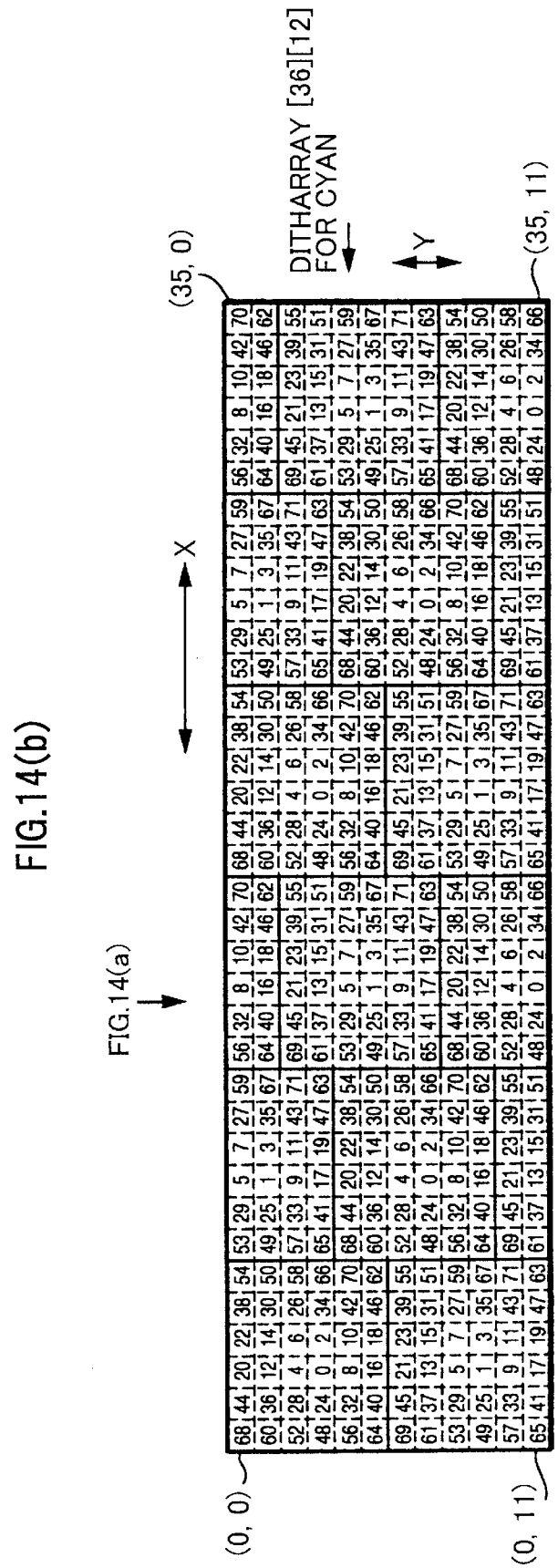

IMAGE FORMING METHOD

BACKGROUND OF THE INVENTION

1. Field of the Invention

The present invention relates to a method for forming images in an image forming device such as a printer.

2. Description of Related Art

There has been proposed a laser printer of a type as disclosed by U.S. Pat. Nos. 5,640,654 and 5,724,633. In this type of laser printer, a latent electrostatic image is first formed on a photosensitive member according to image light exposed thereon. The latent image is then developed by toner and is transferred onto an image recording mediums such as a sheet of paper, that is being conveyed by a predetermined sheet conveying mechanism. Thus, dots of toner are selectively attached on the surface of the sheet while the sheet is being conveyed in a predetermined sheet conveying direction.

SUMMARY OF THE INVENTION

It is noted, however, that while the sheet of paper is being conveyed by the sheet conveying mechanism, mechanical oscillation possibly occurs onto the sheet conveying mechanism or onto the image recording medium, per se. Conveyance of the image recording medium is therefore irregulated periodically. As a result, undesired stripe images or bandings are formed on the sheet surface. The stripe images extend perpendicularly to the sheet conveying direction, and deteriorates the resultant image.

This problem arises not only in laser printers but also in other various types of printers such as an ink jet printer that selectively attaches dots of ink to the surface of a sheet while conveying the sheet in the sheet conveying direction.

It is therefore an objective of the present invention to overcome the above-described problems and to provide an improved image forming method for forming images while preventing occurrence of jitter.

In order to attain the above object and other objects, the present invention provides a method for forming an image, comprising the steps of: receiving an input image density value for each of a plurality of pixel positions, the plurality of pixel positions being defined two-dimensionally in first and second predetermined directions which are perpendicular to each other; and converting the input image density value for each pixel position into output data for indicating whether to turn ON or OFF a pixel dot on the corresponding pixel position, by repeatedly locating a dither matrix along the first and second predetermined directions, the dither matrix including a plurality of threshold values which are arranged two-dimensionally in the first and second predetermined directions in a manner that pixel dots will be turned ON in a predetermined order when the input image density value changes uniformly successively, the predetermined order being defined so that as the input image density gradually increases, a linear pattern is first generated to extend parallel to the first direction and then grows along the second direction, comparing the input image density value at each pixel position with a threshold value at a corresponding location of the dither matrix, and producing, based on the compared result, the output data for each pixel location. The method may further comprise the step of selectively forming, based on the output data, a pixel dot at each pixel position on an image recording medium, while conveying the image recording medium in the first predetermined direction.

The dither matrix may have a plurality of cells that are arranged in several rows and in several columns. Each row extends along the second direction, and each column extends along the first direction. The plurality of threshold values are allocated in the plurality of cells, respectively. The dither matrix serves to selectively turn ON dots at its constituent cells in a particular pattern that corresponds to the input image density value inputted to pixel positions corresponding to those cells.

The plurality of threshold values may be arranged in the dither matrix so that the amount of the threshold value will increase first in the first predetermined direction, and then increase in the second predetermined direction.

Thus, according to the present invention, the threshold values are set in the dither matrix so that as the input image density increases, a linear pattern will first grow in the first direction, in which the image recording medium such as a sheet of paper is conveyed. The linear pattern is formed from turned-ON pixel dots arranged in the first direction. For example, when each pixel dot is produced by black color, the linear pattern appears a black line on a black-and-white image. Accordingly, even when the image recording medium or a mechanism for conveying the image recording medium generates oscillation, the amount of the area of the image pattern, produced by the turned-ON dots, will change very little because the image pattern extends in the image recording medium conveying direction. Accordingly, the jitter problem can be properly avoided.

This is contrary to the case where a comparative dither matrix is used. In the comparative dither matrix, threshold values are determined one by one spirally around the center location of the dither matrix so that the amount of the threshold value will increase spirally outwardly from the center location. In the comparative dither matrix, threshold values may be determined one by one from some corner-edge location so that the amount of the threshold value will increase away from that corner-edge. According to the comparative dither matrix, as the input image density increases, an image pattern will grow from the center of the dither matrix spirally outwardly, or will gradually spread from some corner-edge. Accordingly, when the image recording medium oscillates in its conveying direction, undesirable bandings or stripes will be formed in the image pattern perpendicularly to the conveying direction.

It is noted that a resolution drops if the size of the dither matrix is increased. Accordingly, the size of the dither matrix has to be limited to some value. Because the dither matrix size is thus limited, the threshold values can not be arranged to grow infinitely. Accordingly, threshold values are arranged so that when the linear image pattern grows to reach both edges of the dither matrix in the first direction, the linear image pattern will then grow in the direction perpendicular to the first direction. That is, the threshold values are arranged go that after the threshold value increases in the first direction in the entire length of the dither matrix, then the threshold value will increase in the second direction. With this method, it is possible to restrain occurrence of jitter successfully to a great degree that even when undesirable bandings or stripes are produced, they will not be visually perceived.

The dither matrix may have a length in the first direction and a width in the second direction, the length being greater than the width. In comparison with a square-shaped comparative dither matrix whose length is equal to the width, the rectangular-shaped dither matrix, whose length is longer than the width, can reproduce a higher input image density by the linear pattern. In other words, the first direction-elongated dither matrix can reproduce halftone images of a higher density without being effected by the jitter problem, in comparison with the square-shaped dither matrix. Occurrence of jitter can therefore be avoided more effectively.

The predetermined order may be defined to turn ON a first pair of two dots, after completely producing the linear pattern over an entire length of the dither matrix in the first direction, so that a line connecting the first pair of two dots will form a predetermined angle with respect to the second direction, the predetermined angle being substantially equal to an angle that is formed between the second direction and a direction, in which the dither matrix is repeatedly located along the second direction.

The threshold values may be arranged in the dither matrix in the predetermined order so that the threshold values, of a predetermined minimum value to a first predetermined middle value greater than the predetermined minimum value, are allocated one by one in a predetermined region that is defined within the dither matrix and that extends in the first direction, and then the threshold values of second and third predetermined middle values that are greater than the first predetermined middle value are allocated one by one at a pair of locations that are positioned in the second direction relative to the predetermined region, the line connecting the first and second predetermined middle values forming the predetermined angle with respect to the second predetermined direction.

For example, two or more adjacent rows in the dither matrix may be grouped into a single group of rows. The number of the rows, to be grouped into a single group, is determined according to the angle formed between the second direction and the direction, in which the dither matrix is repeatedly located along the second direction. The second and third middle threshold values are allocated in a pair of cell locations. The pair of cell locations are respectively positioned in two columns that sandwich therebetween the cell locations already allocated with the minimum threshold value to the first middle threshold value. The pair of cell locations are located in two rows within the row group so that the line connecting the pair of cell locations will form the predetermined angle with respect to the second direction.

It is noted that when converting the input image density value into output data, the dither matrix may be repeatedly laid down over a two-dimensional plane, where the plurality of pixel positions are defined, in a periodic manner. The dither matrix may be repeatedly located parallel to the second direction without being shifted in the first direction. That is, the dither matrix may be repeatedly located in a lattice manner. In this case, the dither matrix allows the image pattern to grow from the already-formed linear pattern in a direction perpendicular to the linear pattern.

It is noted that the dither matrix may be repeatedly located along the second direction while being successively shifted in the first direction. When the dither matrix is repeatedly located in the second direction while being shifted upwardly rightwardly by a screen angle of about 17 degrees, for example, the dither matrix allows the image pattern to grow from the already-formed linear pattern also upwardly rightwardly by about 17 degrees.

According to this method, turned-ON dots will be generated regularly, and therefore can highly accurately reproduce original halftone of the inputted images. Thus, not only occurrence of jitter can be prevented, but also reproducibility of halftone images can be enhanced.

The receiving step may receive an input image density value indicative of a density value, for each of cyan and magenta color components, of a color image desired to be produced. The converting step may repeatedly locate, in the first and second predetermined directions, the dither matrix for each of a cyan color component and a magenta color component, the dither matrix for each color component being for determining dots to be turned ON, whose number corresponds to an input image density value of the each color component, the dither matrix for each color component having a plurality of threshold values which are arranged according to the predetermined order in the first and second directions, a position where a dot is to be first turned ON according to the cyan dither matrix along the second direction being different from a position where a dot is to be first turned ON according to the magenta dither matrix in the second direction, the converting step comparing, at each pixel position, the input image density value for each color component with a threshold value at a corresponding location in the corresponding color dither matrix, and producing, based on the compared result, output data for selectively turning ON and OFF each pixel dot f or the corresponding color. The pixel dot forming step may selectively form, based on the output data, a pixel dot of each color component at each pixel position on the image recording medium while conveying the image recording medium in the first direction.

The dither matrix for each color component may be repeatedly located along the second direction so that a position where the smallest threshold value in the cyan dither matrix is located along the second direction be different from a position where the smallest threshold value in the magenta dither matrix is located in the second direction.

It is noted that cyan and magenta are strongly responsive to other colors. In other words, each of cyan and magenta will influence on other colors when being laid as overlapped on the other colors. It is therefore important to arrange dots of cyan and magenta colors on the image recording medium so that they will be perceived separately. Especially for a low density region of an image to be produced, it is necessary that cyan and magenta colors will be perceived as being discriminated from each other.

According to the above-described arrangement, cyan and magenta will be turned ON at different positions along the second direction when the cyan and magenta densities are lowest. Even when the densities increase, a cyan image and a magenta image will separately grow in the first direction from the initial positions that are different from one another in the second direction. Accordingly, when both the cyan and magenta densities are low, those colors will not be mixed up, but will form separated solid line images, both of which extend in the first direction side by side. Thus, color images can be reproduced with high reproducibility.

The receiving step may receive an input image density value indicative of a density value, for each of cyan, magenta, and yellow color components, of the color image desired to be produced. The converting step may repeatedly locate, in the first and second predetermined directions, the dither matrix for each color component, the dither matrix for yellow color component having a plurality of threshold values arranged in the first and second directions, comparing, at each pixel position, an input image density value of each color component with a threshold value at a corresponding location in the corresponding color dither matrix, and producing, based on the compared result, output data for selectively turning ON and OFF each pixel dot for each color component. The pixel dot forming step may selectively form, based on the output data, pixel dot of each color at each pixel position on the image recording medium while conveying the image recording medium in the first direction.

The converting step may include the steps of: repeatedly locating, on a two-dimensional plane defined by the first and second directions to arrange the plurality of pixel positions, the cyan dither matrix along a direction that is shifted from the second direction by a predetermined angle, and comparing, at each pixel position, the input cyan image density value with the threshold value at the corresponding location of the cyan dither matrix; and repeatedly locating, on the two-dimensional plane, the magenta dither matrix in another direction that is shifted from the second direction by another predetermined angle, and comparing, at each pixel position, the input magenta image density value with the threshold value at the corresponding location of the magenta dither matrix.

For example, the cyan dither matrix may be repeatedly laid down over the two-dimensional plane in a periodic manner in a predetermined direction that is shifted from the second direction by about 73 degrees. The magenta dither matrix may be repeatedly laid down over the two-dimensional plane in another periodic manner in the other predetermined direction that is shifted from the second direction by about −73 degrees. Because the cyan dither matrix and the magenta dither matrix are thus repeatedly arranged in different fashions, turned-ON cyan dots and turned-ON magenta dots will be dispersed regularly. Accordingly, cyan and magenta image patterns will be arranged regularly so that undesirable mixture of cyan and magenta colors can be avoided. With this arrangement, color reproducibility is further enhanced. p A position where a dot is to be first turned ON according to the cyan dither matrix in the first direction may be different from a position where a dot is to be first turned ON according to the magenta dither matrix in the first direction. A position where the smallest threshold value in the cyan dither matrix is located in the first direction may be different from a position where the smallest threshold value in the magenta dither matrix is located in the first direction.

Accordingly, a location where a cyan dot will be turned ON for the cyan lowest density is different not only in the second direction but also in the first direction from the location where a magenta dot will be turned ON for the magenta lowest density. Accordingly, when densities of both colors are low, dots of both colors will be turned ON in differently-dispersed manners not only in the second direction but also in the first direction. Accordingly, reproducibility is enhanced for low densities of cyan and magenta. Color images can be reproduced with high reproducibility.

A position where a dot is to be first turned ON according to the yellow dither matrix in the second direction may be different from positions where dots are to be first turned ON according to the cyan and magenta dither matrices in the second direction. A position where the smallest threshold value in the yellow dither matrix may be located in the second direction is different from positions where the smallest threshold values in the cyan and magenta dither matrices are located in the second direction.

The dither matrices for cyan, magenta, and yellow colors may be repeatedly located in the second direction in a periodic manner so that a position where the smallest threshold value in the yellow dither matrix is located in the second direction is different from positions where the smallest threshold values in the cyan and magenta dither matrices are located in the second direction.

With this arrangement, dots of cyan, magenta, and yellow will be turned ON from different dot locations when densities of cyan, magenta, and yellow are low. In this case, reproducibility is enhanced not only for cyan and magenta but also for yellow. Reproducibility is enhanced especially when inputted image densities are low for all the colors. It is possible to reproduce images of any desired thin tones with high reproducibility.

According to another aspect, the present invention provides a method for forming an image, comprising the steps of: receiving an input image density value for each of a plurality of pixel positions, the plurality of pixel positions being defined two-dimensionally in first and second predetermined directions which are perpendicular to each other; converting the input image density value for each pixel position into output data for indicating whether to turn ON or OFF a pixel dot on the corresponding pixel position, by repeatedly locating a dither matrix along the first and second predetermined directions, the dither matrix including a plurality of threshold values which are arranged two-dimensionally in the first and second predetermined directions in a manner that pixel dots will be turned ON in a predetermined order when the input image density value changes uniformly successively, the predetermined order being defined so that as the input image density gradually increases, a linear pattern is first generated to extend parallel to the first direction and then grows along the second direction, comparing the input image density value at each pixel position with a threshold value at a corresponding location of the dither matrix, and producing, based on the compared result, the output data for each pixel location; and selectively forming, based on the output data, a pixel dot at each pixel position on an image recording medium while conveying the image recording medium in the first predetermined direction.

According to still another aspect, the present invention provides an image forming device for forming an image, comprising: means for receiving an input image density value for each of a plurality of pixel positions, the plurality of pixel positions being defined two-dimensionally in first and second predetermined directions which are perpendicular to each other; and means for converting the input image density value for each pixel position into output data for indicating whether to turn ON or OFF a pixel dot on the corresponding pixel position, by repeatedly locating a dither matrix along the first and second predetermined directions, the dither matrix including a plurality of threshold values which are arranged two-dimensionally in the first and second predetermined directions in a manner that pixel dots will be turned ON in a predetermined order when the input image density value changes uniformly successively, the predetermined order being defined so that as the input image density gradually increases, a linear pattern is first generated to extend parallel to the first direction and then grows along the second direction, comparing the input image density value at each pixel position with a threshold value at a corresponding location of the dither matrix, and producing, based on the compared result, the output data for each pixel location. The image forming device may further comprise means for selectively forming, based on the output data, a pixel dot at each pixel position on an image recording medium, while conveying the image recording medium in the first predetermined direction.

According to still another aspect, the present invention provides an image forming device for forming an image, comprising: means for receiving an input image density value for each of a plurality of pixel positions, the plurality of pixel positions being defined two-dimensionally in first and second predetermined directions which are perpendicular to each other; means for converting the input image density value for each pixel position into output data for indicating whether to turn ON or OFF a pixel dot on the corresponding pixel position, by repeatedly locating a dither matrix along the first and second predetermined directions, the dither matrix including a plurality of threshold values which are arranged two-dimensionally in the first and second predetermined directions in a manner that pixel dots will be turned ON in is a predetermined order when the input image density value changes uniformly successively, the predetermined order being defined so that as the input image density gradually increases, a linear pattern is first generated to extend parallel to the first direction and then grows along the second direction, comparing the input image density value at each pixel position with a threshold value at a corresponding location of the dither matrix, and producing, based on the compared result, the output data for each pixel location; and means for selectively forming, based on the output data, a pixel dot at each pixel position on an image recording medium while conveying the image recording medium in the first predetermined direction.

According to still another aspect, the present invention provides a data recording medium storing data of a program readable by a computer system and for controlling the computer, the program comprising: a program for receiving an input image density value for each of a plurality of pixel positions, the plurality of pixel positions being defined two-dimensionally in first and second predetermined directions which are perpendicular to each other; and a program for converting the input image density value for each pixel position into output data for indicating whether to turn ON or OFF a pixel dot on the corresponding pixel position, by repeatedly locating a dither matrix along the first and second predetermined directions, the dither matrix including a plurality of threshold values which are arranged two-dimensionally in the first and second predetermined directions in a manner that pixel dots will be turned ON in a predetermined order when the input image density value changes uniformly successively, the predetermined order being defined so that as the input image density gradually increases, a linear pattern is first generated to extend parallel to the first direction and then grows along the second direction, comparing the input image density value at each pixel position with a threshold value at a corresponding location of the dither matrix, and producing, based on the compared result, the output data for each pixel location. Thus, the image forming method of the present invention can be realized by a computer system.

BRIEF DESCRIPTION OF THE DRAWINGS

The above and other objects, features and advantages of the invention will become more apparent from reading the following description of the preferred embodiment taken in connection with the accompanying drawings in which:

FIGS. 6(a) through 6(h) illustrate how cyan image patterns are formed by the dither matrices Dc1 and Dc2 for a changing input density, wherein FIG. 6(a) shows image patterns formed for an input density of "3", FIG. 6(b) shows image patterns formed for an input density of "15", FIG. 6(c) shows image patterns formed for an input density of "23", FIG. 6(d) shows image patterns formed for an input density of "24". FIG. 6(e) shows image patterns formed for an input density of 27, FIG. 6(f) shows image patterns formed for an input density of 28, FIG. 6(g) shows image patterns formed for an input density of 51, and FIG. 6(h) shows image patterns formed for an input density of 52;

FIGS. 8(a) through 8(h) illustrate how magenta image patterns are formed by the dither matrices Dm1 and Dm2 for a changing input density, wherein FIG. 8(a) shows image patterns formed for an input density of "3", FIG. 8(b) shows image patterns formed for an input density of "15", FIG. 8(c) shows image patterns formed for an input density of "23", FIG. 8(d) shows image patterns formed for an input density of "24", FIG. 8(e) shows image patterns formed for an input density of 27, FIG. 8(f) shows image patterns formed for an input density of 28, FIG. 8(e) shows image patterns formed for an input density of 51, and FIG. 8(h) shows image patterns formed for an input density of 52;

FIGS. 10(a) through 10(f) illustrate how an yellow image pattern is formed by the dither matrix Dy for a changing input density, wherein FIG. 10(a) shows an image pattern formed for an input density of "1", FIG. 10(b) shows an image pattern formed for an input density of "2", FIG. 10(c) shows image pattern formed for an input density of "3", FIG. 10(d) shows an image pattern formed for an input density of "5", FIG. 10(e) shows an image pattern formed for an input density of "7", and FIG. 10(f) shows an image pattern formed for an input density of "8";

DETAILED DESCRIPTION OF THE PREFERRED EMBODIMENTS

Figure 1:
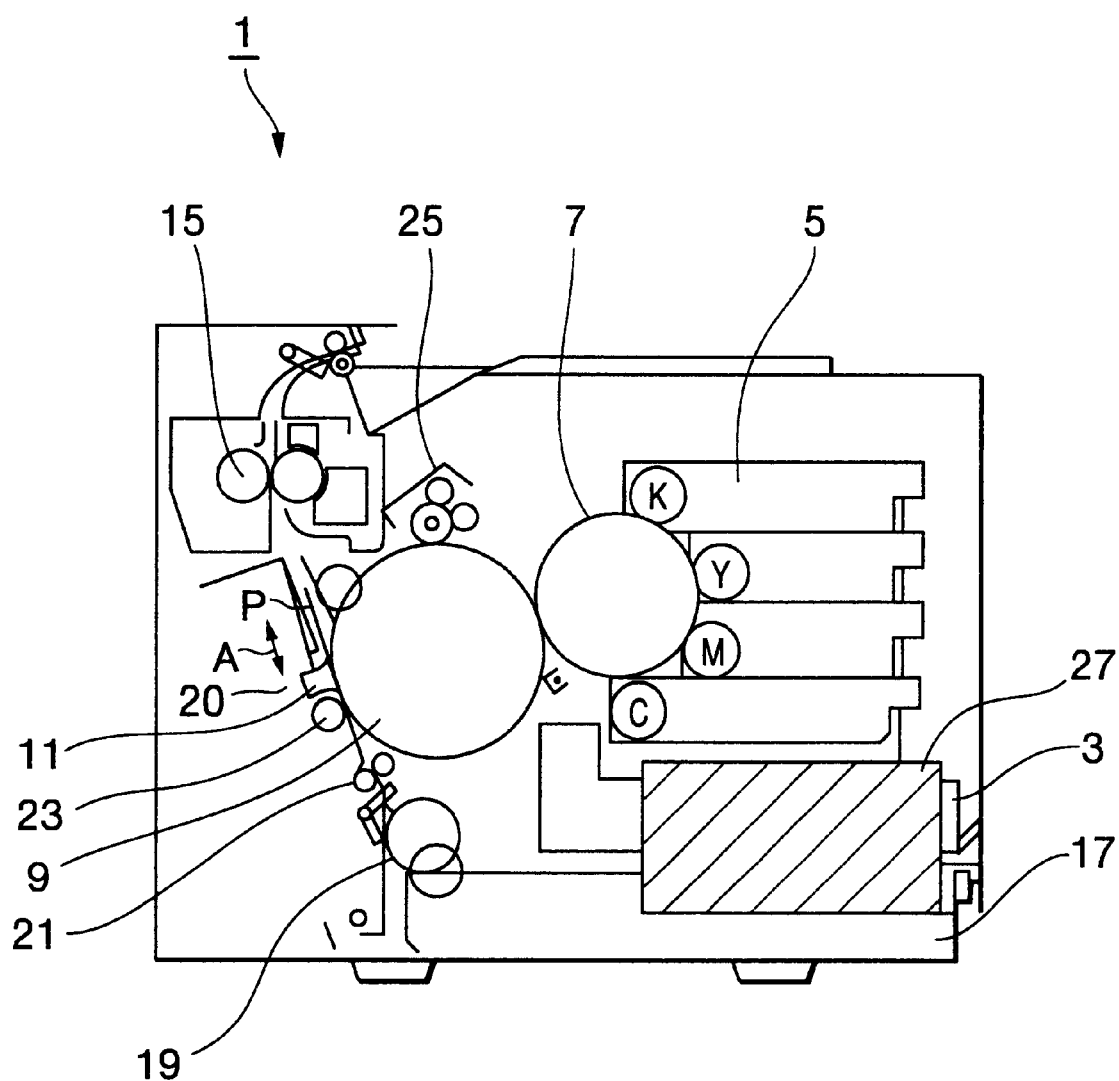
FIG. 1 schematically shows an internal structure of a laser printer according to a first embodiment of the present invention.

An image forming method according to preferred embodiments of the present invention will be described while referring to the accompanying drawings wherein like parts and components are designated by the same reference numerals to avoid duplicating description.

First Embodiment

First, a laser printer 1 employing an image forming method of a first embodiment of the present invention will be described.

FIG. 1 schematically shows the internal structure of the laser printer 1. As shown in the drawing, the laser printer 1 includes, as its main portion, a scanner unit 3, a sheet cassette 17, a toner cartridge 5, a photosensitive drum 7, an image transfer drum 9, an electric charger 11, an image fixing unit 15, and a control unit 27 for controlling the entire portion of the laser printer 1.

The scanner unit 3 includes: a laser device 43 (FIG. 2) for emitting a laser beam; and a scanner or polygon mirror (not shown) for scanning the laser beam onto a surface of the photosensitive drum 7. The laser device 43 is pulse-width modulated according to output data for each of cyan, magenta, yellow, and black colors. The laser device 43 and the scanner (not shown) cooperate to selectively radiate a laser beam onto respective positions on the surface of the photosensitive drum 7, thereby forming a latent image of each color.

The toner cartridge 5 stores therein toner of cyan, magenta, yellow, and black. When the photosensitive drum 7 is formed with a latent image for some color, the toner cartridge 5 is driven by a toner supply motor 53 (FIG. 2) in a well-known manner to supply toner of a corresponding color onto the surface of the photosensitive drum 7, thereby developing the latent image into a corresponding color toner image.

The image transfer drum 9 is for receiving the toner image from the photosensitive drum 7 and for transferring the toner image to a sheet of paper P. More specifically, a sheet conveying path 20 is provided to extend from the sheet cassette 17 to the image fixing unit 15. A pick up roller 19, a pair of positioning rollers 21, an image transfer roller 23, and the electric charger 11 are arranged in this order along the sheet conveying path 20 in a predetermined sheet conveying direction A. The image transfer roller 23 and the electric charger 11 are positioned to confront the image transfer drum 9.

The sheet cassette 17 is for storing a stack of a plurality of sheets of paper. The pick up roller 19 is for picking up one sheet of paper P at a time from the sheet cassette 17. The pair of positioning rollers 21 are for conveying the sheet of paper in the sheet conveying direction A at a controlled feed amount. The image transfer roller 9 is for pressing the sheet of paper against the image transfer drum 9 while the electric charger 11 serves to transfer toner from the image transfer drum 9 onto the surface of the sheet of paper. The fixing unit 15 is for heating the sheet of paper so that toner will be thermally fixed onto the surface of the sheet. A drum cleaner 25 is provided for removing residual toner remaining on the image transfer drum 9 after toner has been transferred to the sheet of paper.

The control unit 27 is for controlling the entire portion of the laser printer 1 to form a desired color image onto a sheet of paper. According to the present embodiment, the control device 27 also serves to generate a dither pattern (binary dot pattern) corresponding to density of input image data inputted from outside.

The control device 27 will be described below with reference to FIGS. 2 and 3.

Figure 2:
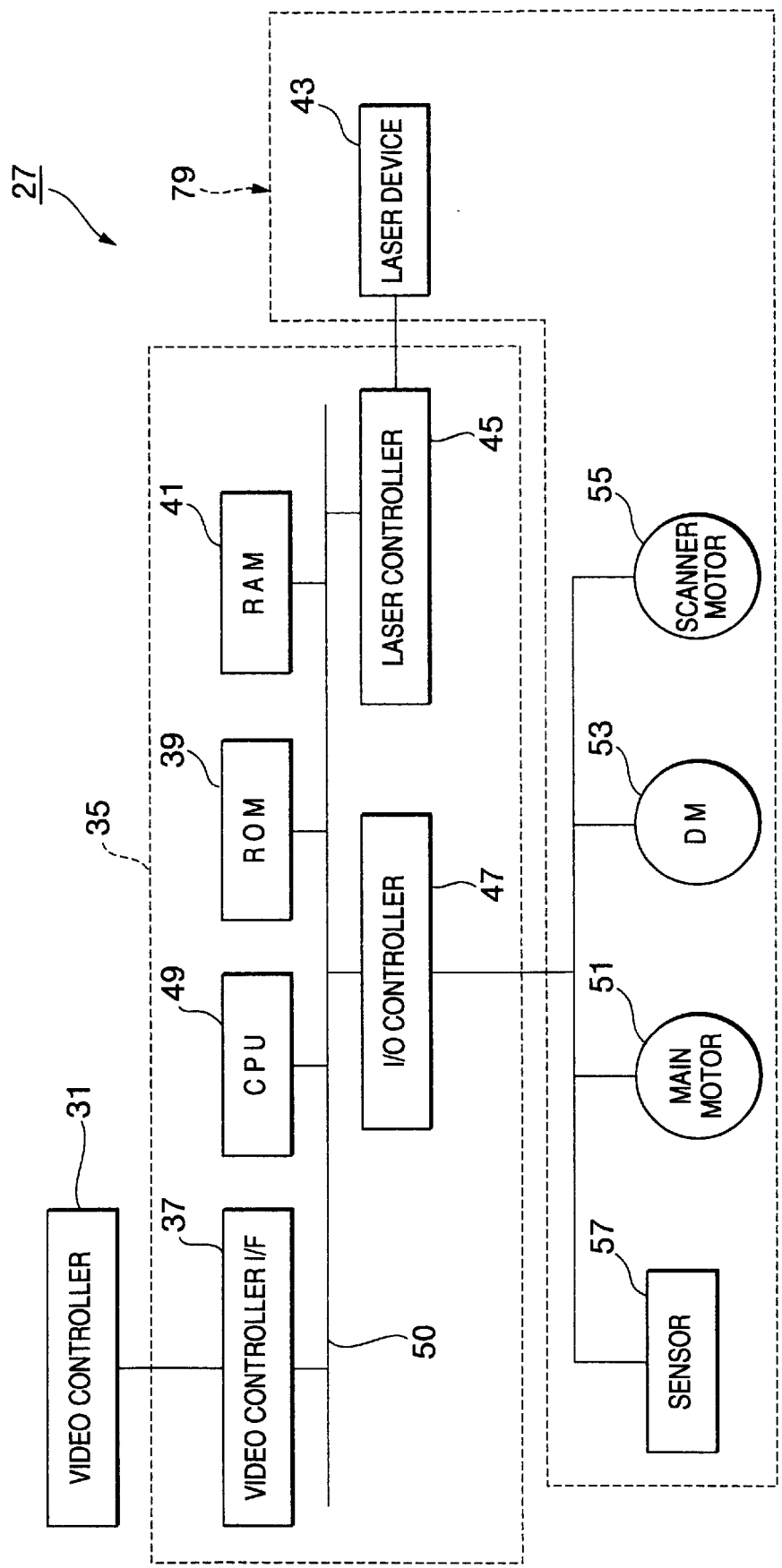
FIG. 2 is a block diagram schematically showing a control device 27 in the laser printer of FIG. 1.

As shown in FIG. 2, the control device 27 includes a video controller 31 and an engine controller 35 as a main portion.

Figure 3:
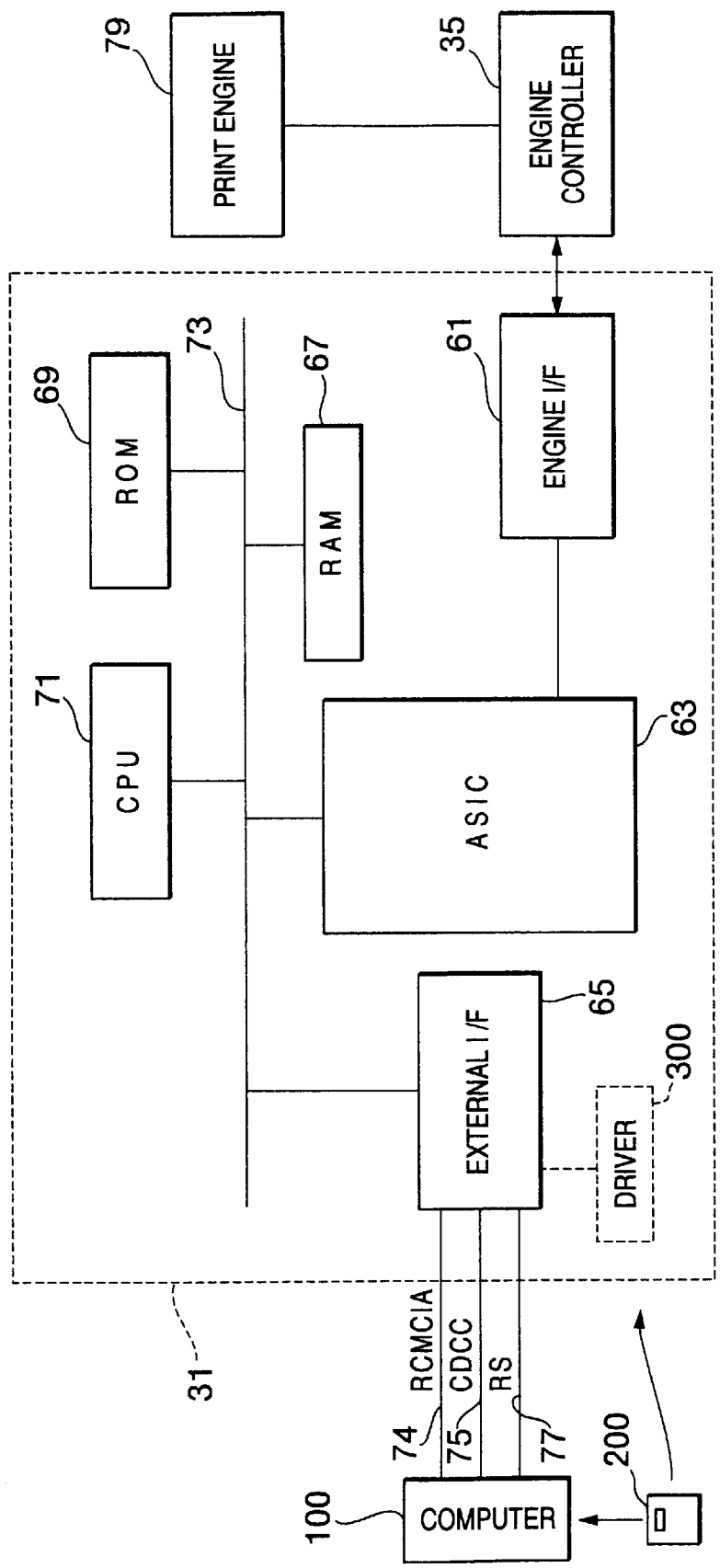
FIG. 3 is a block diagram schematically showing a video controller 31 in the laser printer of FIG. 1.

As shown in FIG. 3, the video controller 31 is constructed as a computer system, and includes: a CPU 71; a RAM 67; a ROM 69; an external I/F 65; and an integrated circuit 63, which are connected to one another via a bus 73. The external I/F 65 is for inputting/outputting data from and to an external device such as a personal computer 100 and the like. The integrated circuit 63 is an application software IC (ASIC), in this example, and is for being exclusively used for video control operation. The integrated circuit (IC) 63 is connected to the external I/F 61 and also to an engine I/F 61. The engine I/F 61 is for inputting/outputting data from and to the engine controller 35.

The external I/F 65 has several terminals 74, 75, and 77. The external I/F 65 can receive multi-level tone color image data via the terminals 74, 75, and 77 from the external device 100. The RAM 67 is for temporarily storing the inputted color image data.

Figure 4:
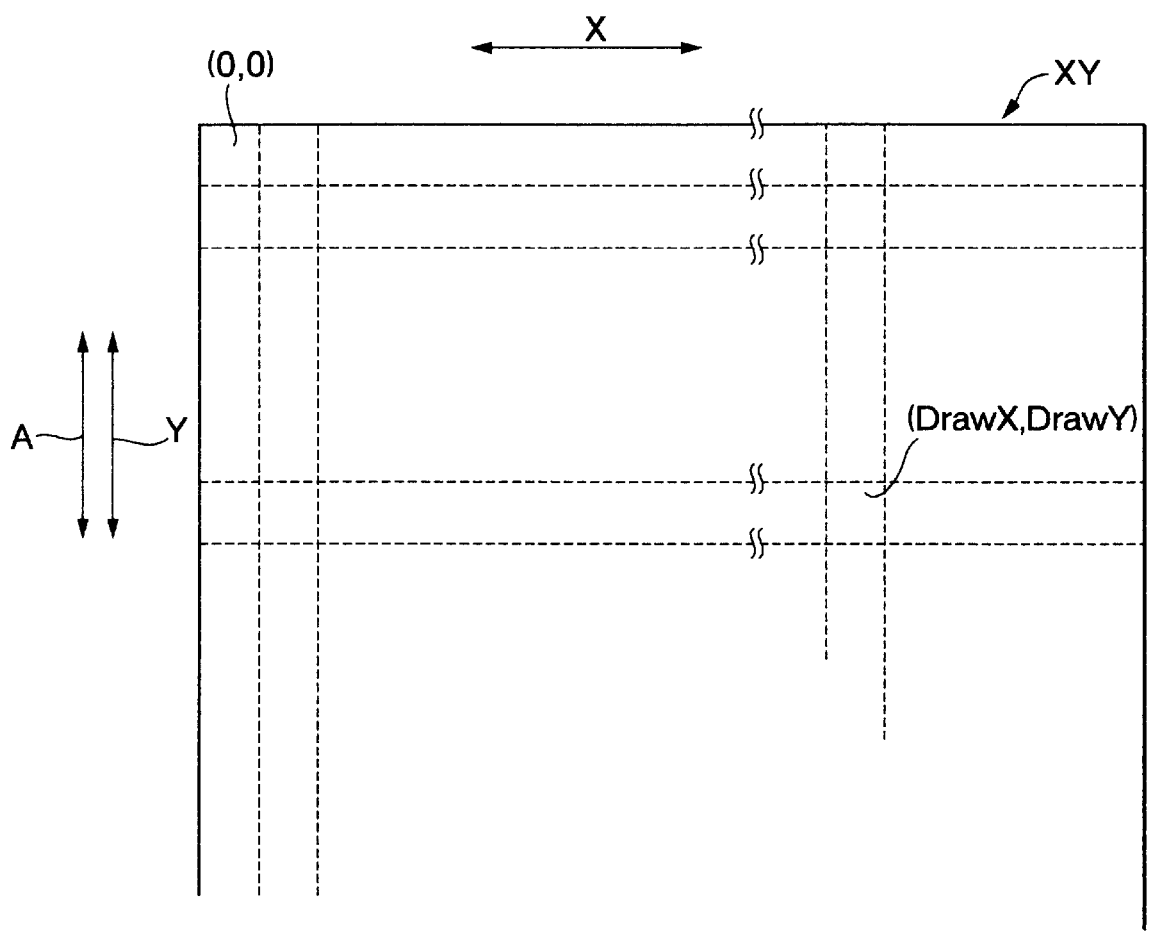
FIG. 4 illustrates a two-dimensional coordinate plane in which a plurality of dot locations (DrawX, DrawY) are arranged.

It is noted that an imaginary two-dimensional coordinate plane XY is defined along a main scanning direction X and an auxiliary scanning direction Y as shown in FIG. 4. The main scanning direction X and the auxiliary is scanning direction Y are perpendicular to each other. A plurality of dot or pixel locations (DrawX, DrawY) are defined on the two-dimensional coordinate plans XY.

The multi-level tone color image data is for representing a halftone color image defined by the plurality of dot locations (DrawX, DrawY) on the two-dimensional plane XY. The multi-level tone color image data is comprised of: cyan multi-level tone image data; magenta multi-level tone image data; yellow multi-level tone image data; and black multi-level tone image data. The multi-tone image data for each color includes a plurality of sets of multi-level tone data. Each set of multi-level tone data represents a value "Density(DrawX, DrawY)" of a multi-level tone for a corresponding dot location (DrawX, DrawY).

The imaginary two-dimensional coordinate plane XY is defined on the surface of the photosensitive drum 7, on the image transfer drum 9, and on the sheet of paper P at the same orientation. The imaginary two-dimensional coordinate plane XY is defined in an orientation that the auxiliary scanning direction Y extends parallel to the sheet conveying direction A, in which the sheet of paper P is conveyed.

The CPU 71 is for controlling the entire portion of the video controller 31. The CPU 71 executes a program shown in FIG. 15, that is prestored in the ROM 69, for converting the multi-level tone data Density(DrawX, DrawY) for each color into output data OUTPUT(DrawX, DrawY) for printing a corresponding bilevel tone image (pseudo-halftone image). More specifically, the ROM 69 stores therein: data of the program of FIG. 15; and data of dither matrices D, i.e., cyan dither matrices Dc1 and Dc2 (FIG. 5(a)), magenta dither matrices Dm1 and Dm2 (FIG. 7(a)), an yellow dither matrix Dy (FIG. 9(a)), and a black dither matrix Db (FIG. 11(a)). The CPU 71 executes the program of FIG. 15 onto each set of cyan, magenta, yellow, and black multi-level tone data Density(DrawX, DrawY) with using the corresponding dither matrix(s), thereby producing output data OUTPUT (DrawX, DrawY) for the corresponding color. The resultant output data OUTPUT(DrawX, DrawY) is transferred via the engine I/F 61 to the engine controller 35.

The engine controller 35 shown in FIG. 2 is for controlling a print engine 79. The print engine 79 includes: the laser device 43 which is provided in the scanner unit 3; a main motor 51; a toner supply motor 53; a scanner motor 55; and several sensors 57 provided in the laser printer 1. Although not shown in the drawing, the print engine 79 further includes: a sheet conveying mechanism comprised from the rollers 19 and 21; a processing mechanism comprised from the members 23, 11, and 15; a polygon mirror (not shown) provided in the scanner unit 3; and the like. The main motor 51 is for rotating the photosensitive drum 7 and for driving the sheet conveying mechanism, the processing mechanism, and the like. The toner supply motor 53 is for driving the toner cartridge 5 to supply toner of a necessary color to the photosensitive drum 7. The scanner motor 55 is for rotating the polygon mirror (not shown) to scan the laser beam emitted from the laser device 43.

The engine controller 35 is constructed as a computer system. The engine controller 35 includes: a video controller I/F 37, a CPU 49, a ROM 39, a RAM 41, an I/O controller 47, a laser controller 45, which are connected to one another via a bus line 50. The video controller I/F 37 is for inputting/outputting data from and to the video controller 31. The laser controller 45 is for controlling the laser device 43 to emit a laser beam. The I/O controller 47 is connected to the main motor 51, the toner supply motor 53, the scanner motor 55, and the several sensors 57 provided in the print engine 79.

The CPU 49 is for controlling the entire portion of the engine controller 35. The CPU 49 is for issuing instruction signals to the laser controller 45 and to the print engine 79 such as the motors 51, 53, and 55, based on the output data OUTPUT(DrawX, DrawY) for each color that is received from the video controller 31 via the video controller I/F 37. The laser controller 45 is controlled to modulate the laser device 43 in a pulse width modulation to selectively radiate the laser beam, for a period of time necessary to form a latent dot image. The motor 55 is controlled to rotate the polygon mirror (not shown) to guide the laser beam to each dot location defined on the surface of the photosensitive drum 7 rotated by the motor 51. Thus, a latent image is formed on the photosensitive drum 7 for each color component. The toner supply motor 53 is controlled to drive the toner cartridge 5 to supply toner of a corresponding color to the photosensitive drum 7. The latent image is therefore developed by toner and is transferred to the image transfer drum 9. The sheet conveying mechanism (rollers 19 and 21) and the processing mechanism (members 23, 11, and 15) are controlled also by the main motor 51 to transfer the toner image from the image transfer drum 9 onto a sheet of paper. The operation for forming a latent image, for developing the latent image, and for transferring the latent image onto the sheet of paper is successively executed for all the color components, thereby producing a color toner image on a single sheet of paper. The color image is formed from toner dots that are selectively attached on the sheet of paper at the plurality of dot locations (DrawX, DrawY).

It is noted that the multilevel density data Density (DrawX, DrawY) is defined to indicate either one tone level within a three or more discrete tone levels. The program of FIG. 15 serves to convert the multilevel density data Density (DrawX, DrawY) into bilevel output data OUTPUT(DrawX, DrawY). The bilevel output data OUTPUT(DrawX, DrawY) is defined to indicate either to turn ON or OFF a dot on the corresponding dot location (DrawX, DrawY).

Figure 15:
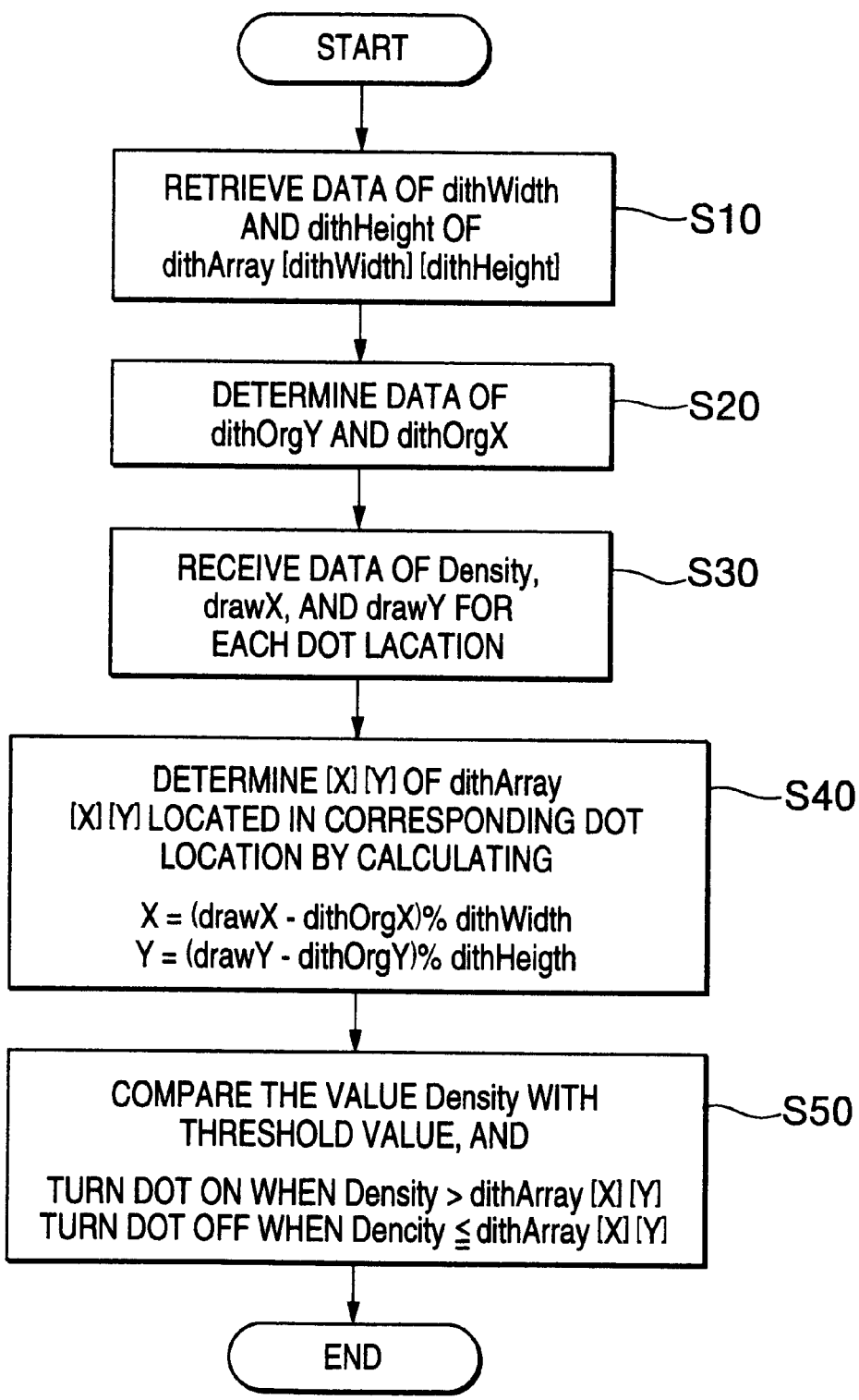
FIG. 15 illustrates a flowchart of an image forming process according to the first embodiment.

More specifically, during the conversion process of FIG. 15, each dither matrix D (Dc1, Dc2, Dm1, Dm2, Dy, and Db), stored in the ROM 69, is used to convert multilevel data Density(DrawX, DrawY) for a corresponding color into bilevel output data OUTPUT(DrawX, DrawY). Each dither matrix D is defined on the two-dimensional coordinate plane XY, and is comprised from a plurality of cells that are arranged in the main and auxiliary scanning directions X and Y in one to one correspondence with the respective dot locations (DrawX, DrawY).

Each cell in each dither matrix D has an integer representing a threshold value determining whether or not a corresponding dot location will be turned "on", i.e., a corresponding color dot or "off", i.e., a white dot. That is, when the input density value Density (DrawX, DrawY) is greater than the threshold value at the corresponding cell location, a dot is turned "on". If the input density value Density (DrawX, DrawY) is less than or equal to the threshold value at the corresponding call location, a dot is turned "off".

Next, the dither matrices D for the respective colors will be described in greater detail.

First, the cyan dither matrices Dc1 and Dc2 will be described with reference to FIGS. 5(a)–6(h) and 12.

Figure 5A:
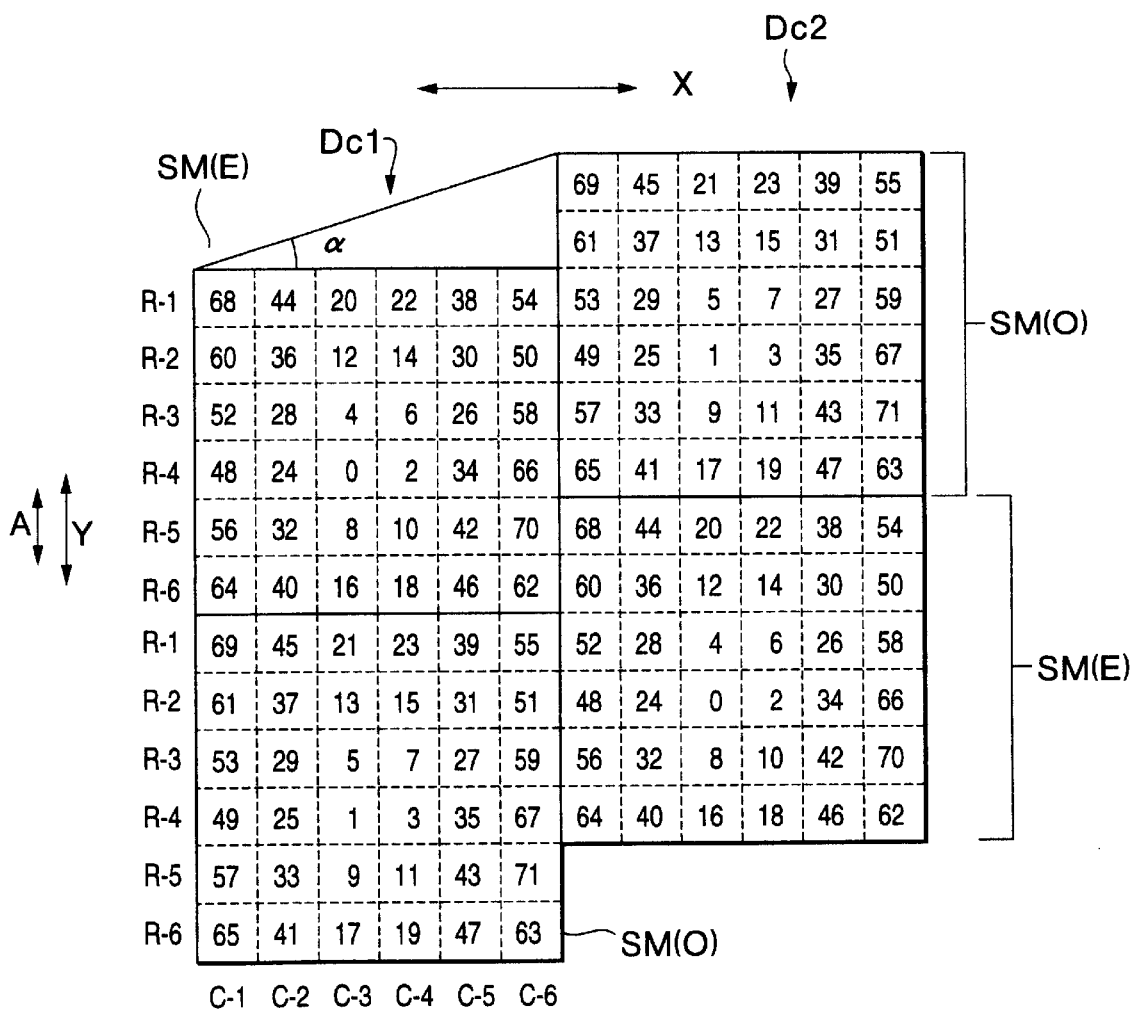
FIG. 5(a) illustrates dither matrices Dc1 and Dc2 used as a basis for forming cyan image patterns according to the first embodiment.

The pair of dither matrices Dc1 and Dc2 shown in FIG. 5(a) are for converting multilevel density data Density (DrawX, DrawY) for cyan color into bilevel output data OUTPUT(DrawX, DrawY), thereby converting a multilevel cyan tone image into a bilevel cyan tone image. It is noted that the multilevel tone data Density(DrawX, DrawY) for cyan color represents a cyan color halftone image by 73 discrete cyan tone levels from zero "0" to "72".

As shown in FIG. 5(a), the dither matrices Dc1 and Dc2 are defined on the two-dimensional coordinate plane XY as being arranged adjacent to each other along the main scanning direction X. Each dither matrix Dc1 and Dc2 is of a rectangular shape elongated in the auxiliary scanning direction Y (sheet conveying direction A). Each dither matrix Dc1, Dc2 is comprised from 72 cells, in total, which so are arranged in twelve (12) rows in the auxiliary scanning direction Y (sheet conveying direction A) and in six (6) columns in the main scanning direction X.

Each dither matrix Dc1 and Dc2 is constructed from two submatrices SM(E) and SM(O). Each of the submatrices SM(E) and SM(O) is comprised from 36 cells, in total, which are arranged in six (6) rows R-1 through R-6 in the auxiliary scanning direction Y (sheet conveying direction A) and in six (6) columns C-1 through C-6 in the main scanning direction X. In the dither matrix Dc1, the submatrix SM(E) is located in an upside position of the submatrix SM(O) in the drawing. Contrarily, in the dither matrix Dc2, the submatrix SM(E) is located below the submatrix SM(O) in the drawing. Thus, the dither matrix Dc2 is produced by changing the relative positions of the submatrices SM(E) and SM(O) in the dither matrix Dc1 along the auxiliary scanning direction Y.

As shown in the drawing, the dither matrix Dc2 is located relative to the dither matrix Dc1 as being shifted by two-cells worth of distance in the auxillary scanning direction Y. In other words, the dither matrices Dc1 and Dc2 are arranged at a fixed, predetermined screen angle α of 17 degrees. In this example, relative to the main scanning direction X.

Figure 5B:
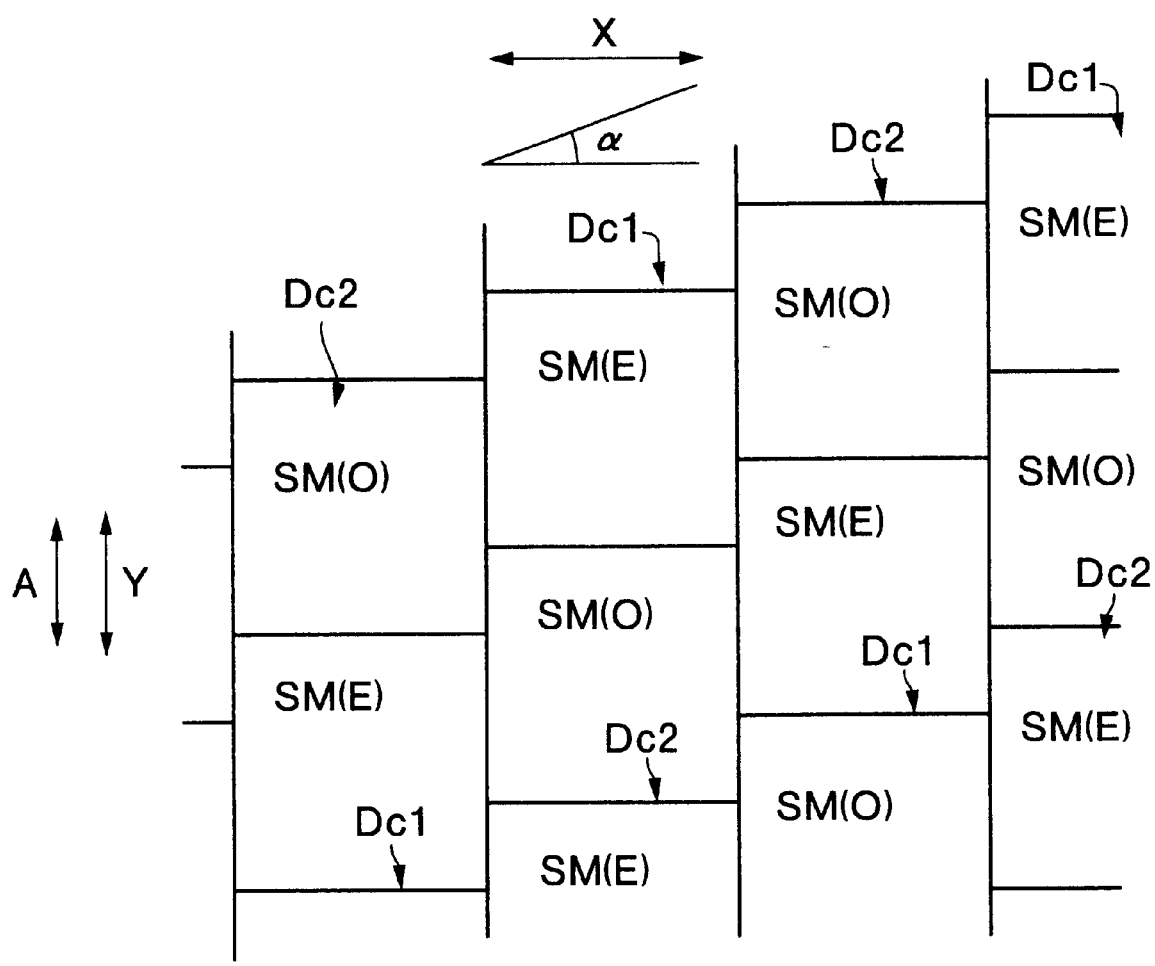
FIG. 5(b) illustrates how the dither matrices Dc1 and Dc2 are repeatedly located on the two-dimensional coordinate plane.
Figure 12A:
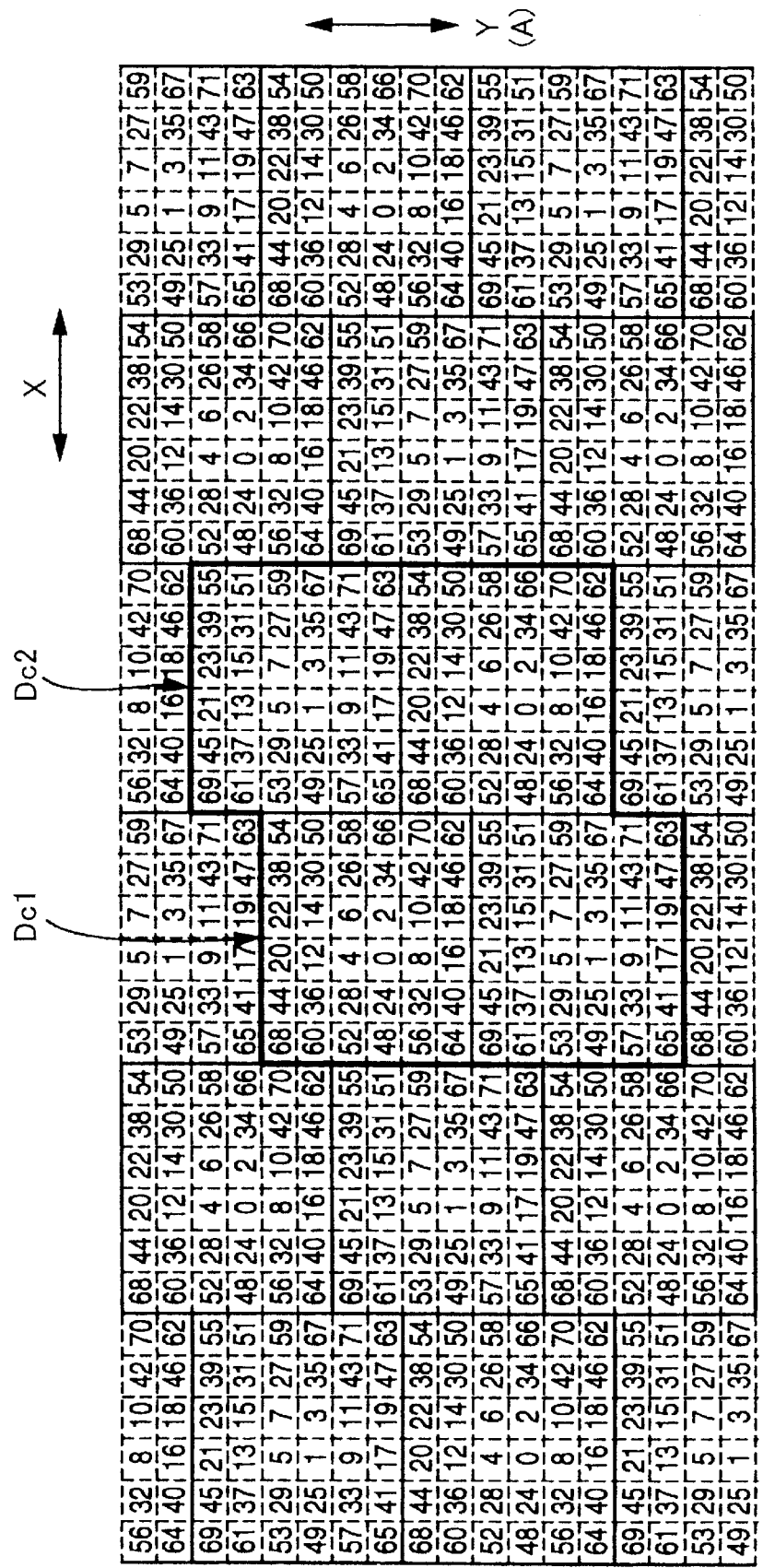
FIG. 12, represented by FIGS. 12(a)–12(d), illustrates the positional relationship between the cyan dither matrices Dc1 and Dc2, the magenta dither matrices Dm1 and Dm2, the yellow dither matrix Dy, and the black dither matrix Db along the main scanning direction X when those matrices are repeatedly located over the two-dimensional coordinate plane.
Figure 12B:
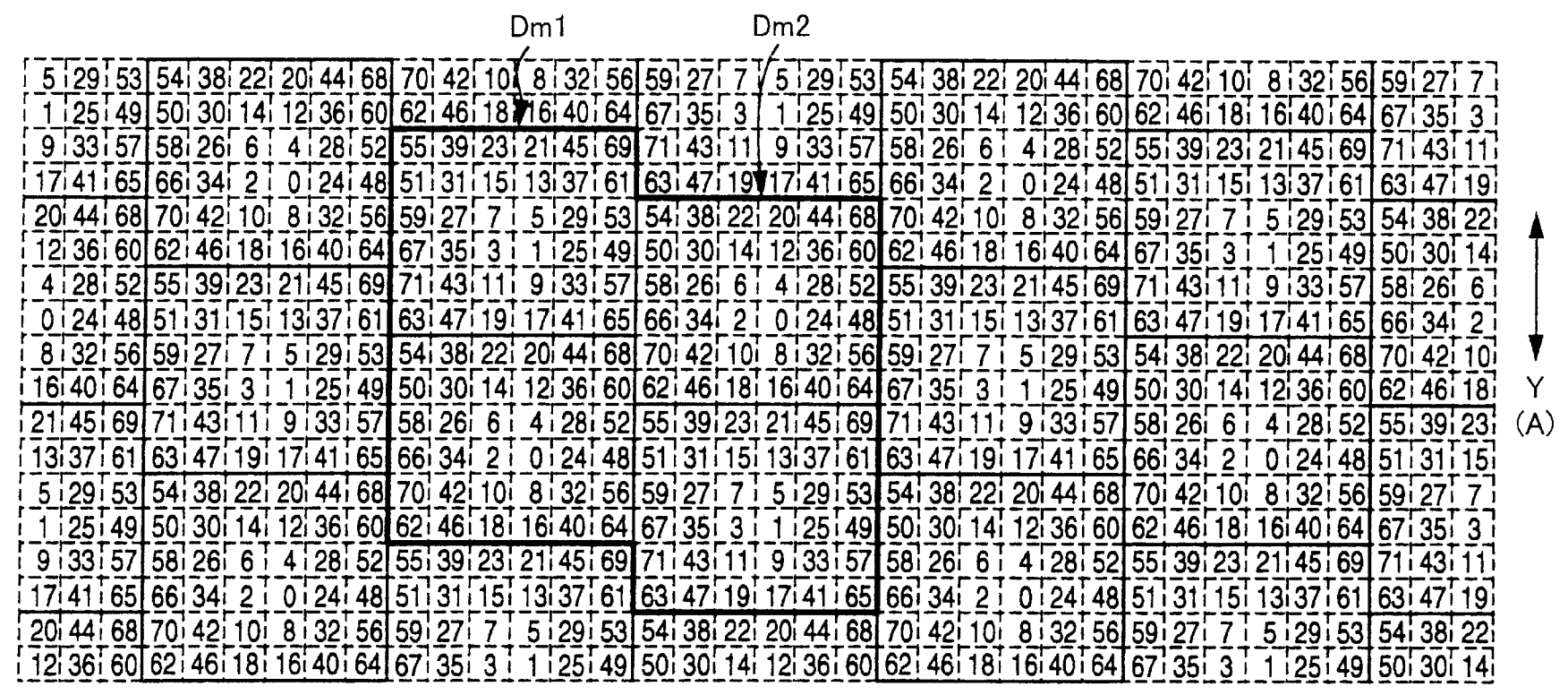
Figure 12C:
Figure 12D:
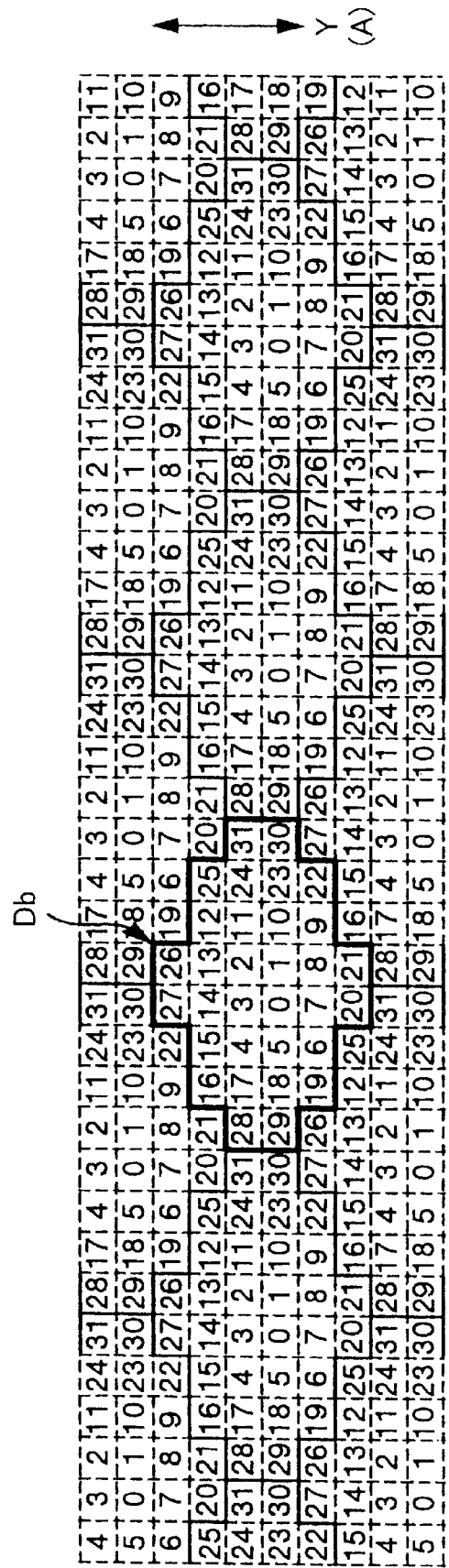

During the converting process of FIG. 15, the pair of matrices Dc1 and Dc2 are repeatedly laid down over the two-dimensional coordinate plane XY (FIG. 4) of the input cyan multi-tone image in a repetition manner as shown in FIGS. 5(b) and 12, thus tiling the input image. Each cell is located over a corresponding one dot location (DrawX, DrawY). As apparent from FIG. 5(b), the submatrices SM(E) and SM(O), constituting each dither matrix Dc1 and Dc2, are arranged in an alternate fashion. The submatrices SM(E) and SM(O) are arranged also at the predetermined screen angle α of 17 degrees with respect to the main scanning direction X.

As shown in FIG. 5(a), a value in each cell location in the dither matrices Dc1 and Dc2 represents a threshold value. The threshold value is an integer in a range of zero (0) to "71". For example, a cell having the threshold value of "37" serves to turn ON a cyan dot at a dot location (DrawX, DrawY), that corresponds to the subject call, when a cyan density value "Density(DrawX, DrawY)" at that dot location is greater than or equal to "38". With this structure, each dither matrix Dc1, Dc2 can reproduce 72 different cyan tones by selectively turning dots ON or OFF at its constituent cell locations.

Threshold values are arranged in each of the dither matrices Dc1 and Dc2 in a manner described below.

It is noted that when a uniform input density Density (DrawX, DrawY) is inputted to dot locations (DrawX, DrawY) that correspond to all the cells of the dither matrix Dc1 (Dc2), dots are turned ON selectively at some of the cells, thereby forming a particular dot pattern corresponding to the value of the input density. As the input density increases from its lowest value of zero (0), the dot pattern first grows to extend in the auxiliary scanning direction Y (sheet conveying direction A) as shown in FIGS. 6(a)–6(d). When the input density reaches "24", as shown in FIG. 6(d), the dot pattern becomes a complete dot line (solid line) 81C that has a two cells' worth of width and that extends entirely over the length of each submatrix SM(E), SM(O) along the auxiliary scanning direction Y (sheet conveying direction A). As the input density further increases, the dot pattern will further grow to extend in the main scanning direction X as shown in FIGS. 6(e)–6(h). More specifically, the dot pattern will grow from the solid line 81C to extend slantedly, with an angle, substantially equal to the screen angle α (17 degrees in this example), being formed with respect to the main scanning direction X. This conforms to the arrangement how the dither matrices Dc1 and Dc2 are arranged as shown in FIGS. 5(a) and 5(b).

Next will be given detailed description of how threshold values are arranged in each submatrix SM(E) and SM(O).

It is noted that as shown in FIG. 5(a), the submatrix SM(E) is constructed from 36 even-numbered threshold values "0"–"70", while the other submatrix SM(O) is constructed from 36 odd-numbered threshold values "1"–"71." Except for this point, threshold values are arranged in the submatrices SM(E) and SM(O) in the same order from the minimum value ("0" or "1") to the maximum value ("70" or "71"). Following description will therefore be given for the submatrix SM(E) only.

In order to produce the submatrix SM(E), twelve successive even-numbered threshold values "0"–"22" are first arranged in the two central columns C-3 and C-4. Then, twelve next successive even-numbered threshold values "24"–"46" are arranged in a pair of inner side columns C-2 and C-5. The inner side columns C-2 and C-5 are located on both left and right sides of the central columns C-3 and C-4 in the drawing. Then, remaining twelve successive even-numbered threshold values "48"–"70" are arranged in a pair of outer side columns C-1 and C-6. The outer side columns C-1 and C-6 are located on both left and right sides of the inner side columns C-2 and C-5, that is, on both left and right side edges of the submatrix SM(E).

As apparent from FIG. 5(a), the smallest threshold value "0" is first located in a cell that is positioned on the central third column C-3 at a central fourth row R-4. The second smallest value "2" is located adjacent to "0", that is, on the central fourth column C-4 at the same row R-4. Then, the next smallest values "4" and "6" are respectively located on the central columns C-3 and C-4 at the third row R-3. The next smallest values "8" and "10" are respectively located on the central columns C-3 and C-4 at the fifth row R-5. Thus, the threshold values from "0" to "22" are allocated in the central columns C-3 and C-4, in an order from the central fourth row R-4, through the rows R-3, R-5, R-2, and R-6, to the first row R-1. In other words, values "0" through "22" are successively allocated in the cells on the central columns C-3 and C-4 in alternation. In each column C-4 (C-3), the threshold values are allocated alternately in upper and lower positions of the already-allocated cell positions. Thus, values "0" to "22" are allocated in all the cells in the central columns C-3 and C-4.

The next smallest value "24" is then located in the second column C-2 (inner side column) at the fourth row R-4. The next smallest value "26" is then located in the fifth column C-5 (other inner side column) at the third row R-3. Then, values "28" through "46" are successively allocated in the inner side columns C-2 and C-5 in alternation. In each column C-2 (C-5), the threshold values are located also alternately in upper and lower positions of the already-allocated cells. Thus, values "24" to "46" are allocated in all the cells of the inner side columns C-2 and C-5.

Then, the next smallest value "48" is located in the first column (outer side column) C-1 at the fourth row R-4. The next smallest value "50" is then located in the sixth column (other outer side column) C-6 at the second row R-2. Then, values "52" through "70" are successively allocated in the cells of the outer side columns C-1 and C-6 in alternation. In each column C-1 (C-6), the threshold values are allocated alternately in upper and lower positions of the already-allocated cell positions. Thus, values "48" to "70" are allocated in all the cells in the outer side columns C-1 and C-6. Thus, all the values "0" to "70" are allocated in all the cells of the submatrix SM(E).

It is now assumed that the uniform input density Density (DrawX, DrawY) is inputted for dot locations (DrawX, DrawY) corresponding to all the cells of the submatrix SM(E) and that the uniform input density gradually increases from the lowest value of zero (0). In this case, a dot pattern formed from turned-on dots will first grow substantially in the central portion of the submatrix SM(E). That is, dots are first generated at the fourth row R-4 in the central columns C-3 and C-4. Then, the dot pattern will successively grow in the central two columns C-3 and C-4 along the auxiliary scanning direction Y (sheet conveying direction A) upwardly and downwardly in alternation.

When the input density reaches "23", all the dots in the central two columns C-3 and C-4 of the submatrix SM(E)

are turned ON, thereby completely forming a two-dot wide solid line that extends over the entire length of the submatrix SM(E) in the auxiliary scanning direction Y.

As the input density further increases, dots will be generated alternately in the inner side columns C-2 and C-5, that are located on both left and right sides of the central two columns C-3 and C-4. As a result, the dot pattern will extend rightwardly and leftwardly along the main scanning direction X.

In each of the inner side columns C-2 and C-5, dots are first generated substantially on the central row positions (R-4 and R-3). Then, as the input density increases, the dot pattern grows in the upward and downward direction in alternation. More specifically, when the input density reaches "25", a dot is first turned ON at the second column C-2 at the fourth row R-4. Then, another dot is next turned ON at the fifth column C-5 at the third row R-3 when the input density reaches "27". The pair of dots, thus first turned-ON at both sides of the two-dot wide central solid line, are connected by a slanted line that extends in a direction angularily shifted from the main scanning direction X at an angle equal to the screen angle α. As the input density further increases, dots are generated in the second and fifth columns C-2 and C-5 alternately so as to gradually thicken the slanted dot line, while substantially maintaining its slanted angle. When the input density reaches 47, all the cells in the columns C-2 and C-5 are turned ON, completely forming a four-dot wide solid line in the auxiliary scanning direction Y.

As the input density further increases, dots will be generated alternately in the outer side columns C-1 and C-6, that are located on both left and right sides of the already-formed four cells' worth of dot line. Thus, the dot pattern again extend rightwardly and leftwardly along the main scanning direction X.

In each of the columns C-1 and C-6, dots will be first generated on substantially the central row positions R-4 and R-2 and then the dot pattern grows in the upward and downward direction in alternation. More specifically, when the input density increases to reach the value of "49", a dot is first turned ON at the first column C-1 at the fourth row R-4. Then, when the input density reaches "51", another dot is next turned ON at the sixth column C-6 at the second row R-2. The pair of dots, thus first turned-ON at both sides of the present solid line, are connected by another slanted line that extends in a direction angularily shifted from the main scanning direction X at an angle almost equal to the screen angle α. As the input density further increases, dots are generated in the columns C-1 and C-6 alternately so as to gradually thicken the slanted dot line, while substantially maintaining its slanted angle. When the input density reaches 71, all the cells in the columns C-1 and C-6 are turned ON, completely turning on all the cells in the submatrix SM(E).

To summarize, according to the above-described threshold value arrangement, the threshold values are distributed such that in each row R-1–R-6, the threshold value increases away from a predetermined cell location (third columnar position C-3, in this example) toward both side edges in the main scanning direction X. In this example, each row is comprised from six columnar locations to receive six threshold values. Accordingly, in each row, the smallest threshold value within the six threshold values is located in the predetermined (third) columnar location C-3. The second smallest value is located adjacent to the smallest value in either the right side or left side thereof. The third smallest value is located adjacent to either of the already-arranged two smaller values. In other words, each n-th smallest value (where n is an integer greater than two and smaller than or equal to six) within the six values is located adjacent to either of the already-arranged (n−2)-th through (n−1)-th smallest values. The last smallest value, that is, the highest value is located in either of the right or left side edge (C-1 or C-6) of that row.

According to this arrangement scheme, threshold values "0"–"22" are allocated in the central columns C-3 and C-4. Remaining larger threshold values "24"–"70" are allocated in the side columns C-1, C-2, C-5, and C-6.

The threshold value arrangement in each central column C-3, C-4 is such that the threshold value increases away from a predetermined row position (fourth row position R-4, in this example) upwardly and downwardly along the auxiliary scanning direction Y (sheet conveying direction A). In this example, each column is comprised from six cell locations to receive six threshold values. The smallest threshold value within the six threshold values is therefore located in the predetermined (fourth) row location R-4. The second smallest value is located adjacent to the smallest value in either the upper or lower side thereof. The third smallest value is located adjacent to either of the already-arranged two smaller values. In other words, each n-th smallest value (where n is an integer greater than two and smaller than or equal to six) within the six values is located adjacent to either of the already-arranged (n−2)-th through (n−1)-th smallest values. The last smallest value, that is, the highest value is located in either of the upper or lower edge (R-1 or R-6) of that column. In this manner, twelve even-numbered threshold values "0", "2", . . . , and "22" are arranged in the central columns C-3 and C-4 as shown in FIG. 5(a).

According to this arrangement, as the input density increases, the dot pattern will grow in the auxiliary scanning direction Y (sheet conveying direction A) from substantially the central row (R-4) to extend toward both the upper and lower edges. The dot pattern grows alternately in upper and lower directions from the already-turned-on dots.

Threshold value arrangement in each side column C-1, C-2, C-5, and C-6 is such that as the input density increases after the complete dot line pattern is formed in the central columns C-3 and C-4, the dot pattern then grows into the side columns in a slanted manner at a slanted angle, substantially equal to the screen angle α.

More specifically, in the inner side column pair C-2 and C-5, the smallest threshold value "24" and the second smallest threshold value "26" are located on the pair of central row positions R-4 and R-3 that are shifted by one cell's worth of distance from each other along the auxiliary scanning direction X. The thus located threshold values "24" and "26" will sandwich the already-formed solid dot line (i.e., the central columns C-3 and C-4) therebetween, and a line connecting the threshold values "24" and "26" forms an angle, substantially equal to the screen angle α, with respect to the main scanning direction X.

In the column pair C-1 and C-6, the smallest threshold value "48" and the second smallest threshold value "50" are located on the other pair of central row positions R-4 and R-2 that are shifted by two cells' worth of distance from each other in the auxiliary scanning direction Y. The thus located threshold values "48" and "50" sandwich the already-formed solid dot line (i.e., columns C-2 to C-5) therebetween, and a line connecting the threshold values "48" and "50" forms an angle, substantially equal to the screen angle α, with respect to the main scanning direction X.

It is noted that the same threshold arrangement as described above is employed in the submatrix SM(O) for odd-numbered threshold values "1" to "71". As shown in FIG. 5(a), the submatrices SM(E) and SM(O) are arranged in the main scanning direction X so that each submatrix SM(E) be shifted in the auxiliary scanning direction Y by a two-cells' worth of distance from an adjacent right-side submatrix SM(O). Accordingly, the value "50," that is first turned ON in the rightside column C-6 of each submatrix SM(E), is arranged as adjacent to the value "49" that is first turned ON in the leftside column C-1 of the right-side adjacent submatrix SM(O). Similarly, a location, where the smallest value "48" exists in the leftslde column C-1 in each submatrix SM(E), is connected to the location, where the smallest value "51" exists in the rightslde column C-6 in the left-side adjacent submatrix SM(O).

With this arrangement, when the input density becomes "51", a dot is formed on the cell location of the threshold value "50" in the submatrix SM(E), and is connected to another dot that has been already formed on the cell location of threshold value "49" in the adjacent submatrix SM(O).

It is preferable to thus take into account the positional relationship between the threshold arrangements in adjacent submatricea SM(E) and SM(O). More specifically, it is preferable that dots, formed in each submatrix SM(E) (SM (O)) at its side edges, be connected with dots formed in adjacent submatrices also at its side edges. Accordingly, in the example of FIG. 5(a), the smallest and second smallest threshold values, within the threshold values to be located in the side columns, are located in the central two or three rows R-4 through R-2.

It is noted that as shown in FIG. 5(a), each of the dither matrices Dc1 and Dc2 is comprised from the submatrix SM(E) which has the above-described threshold arrangement for even-numbered threshold values and the other submatrix SM(O) which has the same threshold arrangement for odd-numbered threshold values. Accordingly, if a uniform density is inputted for dot locations corresponding to all the cells in the dither matrices Dc1 and Dc2, a corresponding specific dot pattern will be formed by the dither matrices Dc1 and Dc2. As the uniform density gradually increases, therefore, the dot pattern formed by the dither matrices Dc1 and Dc2 also gradually changes as described below.

When a uniform density of "1" is inputted to dot locations corresponding to all the cells in the dither matrices Dc1 and Dc2, a dot is turned ON at a cell that has the smallest threshold value of "0" and that is located almost in the center of the submatrix SM(E) in each dither matrix Dc1 and Dc2.

When the input density increases up to "2", two dots are turned ON. That is, a dot is turned ON not only at the cell with the smallest threshold value "0" but also at another cell with the second smallest threshold value "1". The cell with the value "1" is located almost in the center of the submatrix SM(O) in each dither matrix Dc1 and Dc2. It is noted that the positional relationship of submatrices SM(E) and SM(O) in the dither matrix Dc2 is opposite to that in the dither matrix Dc1. Accordingly, dot patterns obtained by the dither matrices Dc1 and Dc2 are opposite to each other along the auxiliary scanning direction Y (sheet conveying direction A).

Figure 6A:
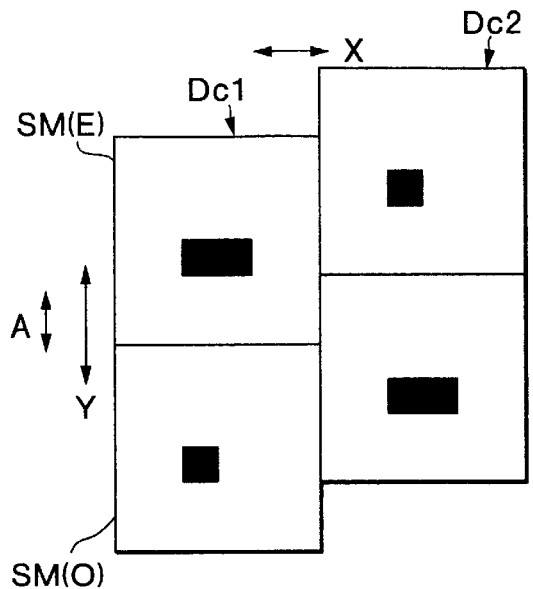
Figure 6B:
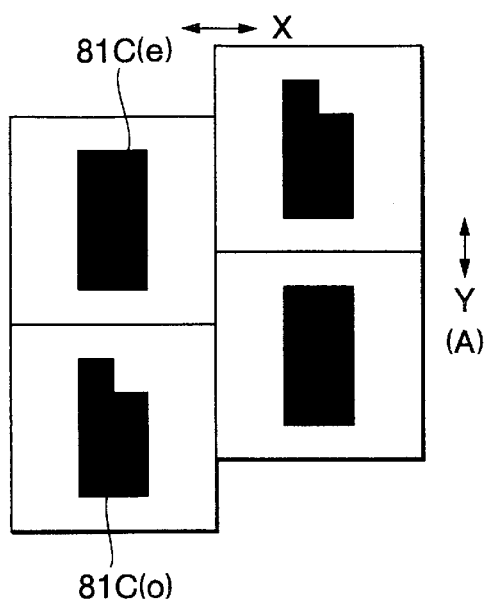
Figure 6C:
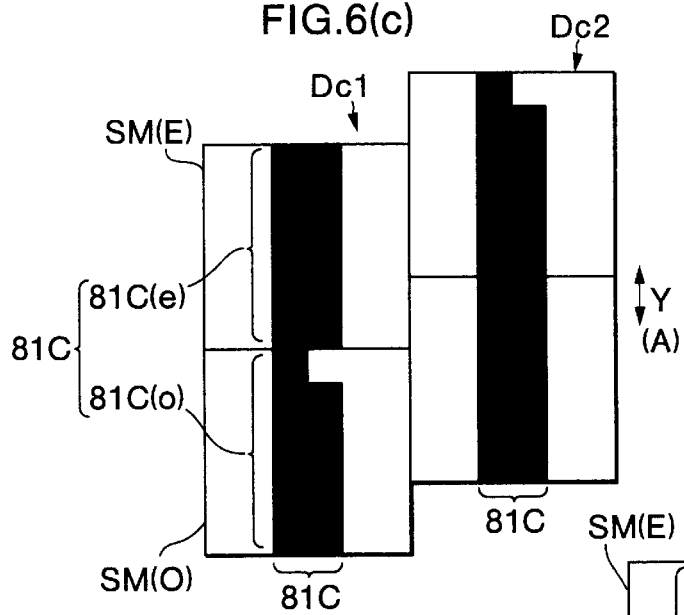
Figure 6D:
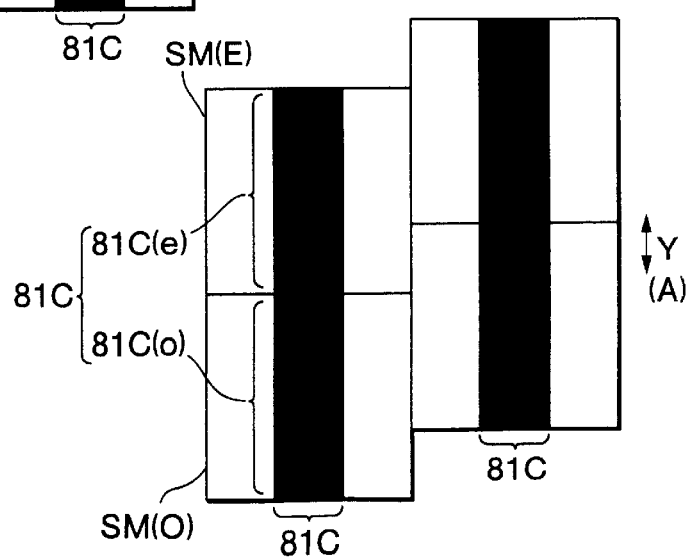

When the input density further increases up to "3", dot patterns are produced by the dither matrices Dc1 and Dc2 as shown in FIG. 6(a). When the input density further increases up to "15", dot patterns are produced as shown in FIG. 6(b). When the input density further increases up to "23", dot patterns are produced as shown in FIG. 6(c). When the input density further increases up to "24", dot patterns are produced as shown in FIG. 6(d).

As apparent from FIGS. 6(a) and 6(b), as the input density increases, the dot pattern in each submatrix SM(E) and SM(O) grows in a direction parallel to the auxiliary scanning direction Y (sheet conveying direction A). As the input density increases, linear patterns 81C(e) and 81C(o) are produced in the submatrices SM(E) and SM(O) to extend in the auxiliary scanning direction Y (sheet conveying direction A). Each linear pattern 81C(o) and 81C(e) has a two-dots' worth of width. As shown in FIGS. 6(c) and 6(d), as the input density further increases, those linear patterns 81C(o) and 81C(e) grow along the auxiliary scanning direction Y (sheet conveying direction A) until they are connected with each other to form a single linear pattern 81C. In the same manner as described above, another linear pattern 81C is formed in the dither matrix Dc2.

Even when oscillation occurs on the sheet of paper in the sheet conveying direction A (Y), the dot pattern thus extending in the sheet conveying direction A (Y) will change very little. Accordingly, tone represented by the image pattern will change little, too. It is therefore possible to prevent occurrence of the jitter problem.

Figure 6E:
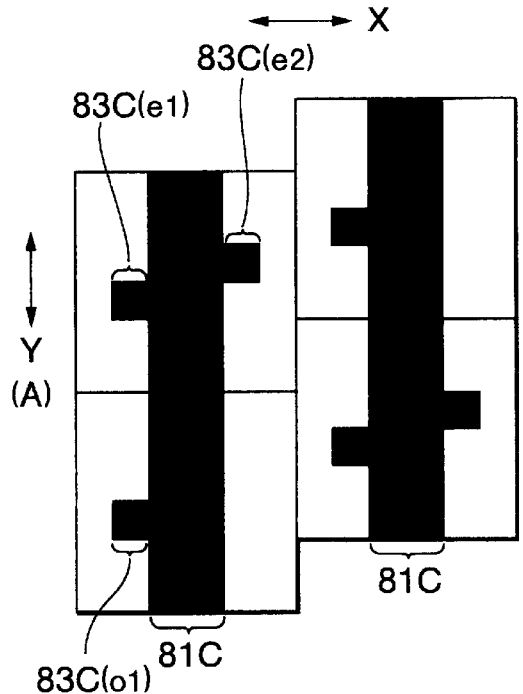
Figure 6F:
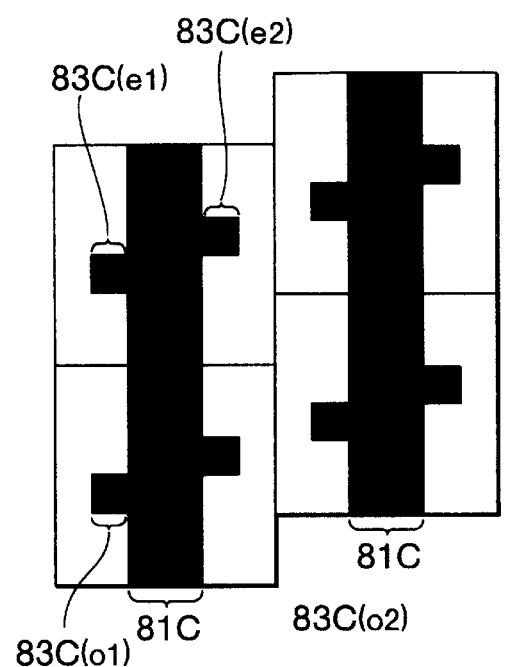
Figure 6G:
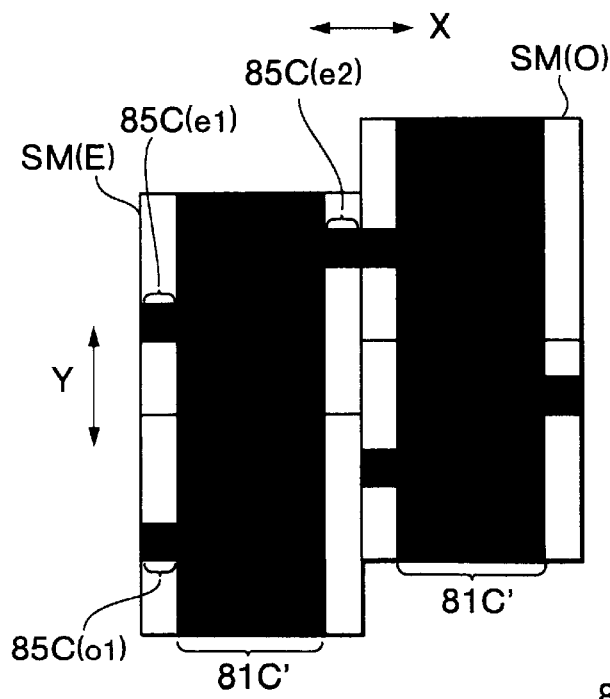
Figure 6H:
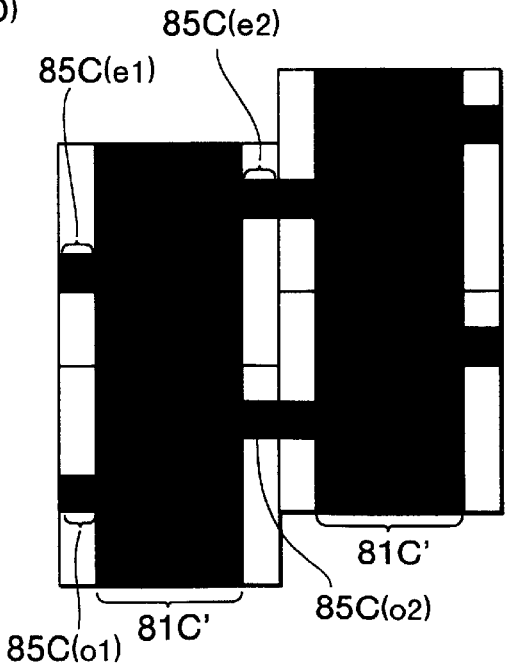

As the density further increases, the dot image patterns produced by the dither matrices Dc1 and Dc2 grow in the main scanning direction X. That is, when the input density increases to reach "27", the image patterns become as shown in FIG. 6(e). When the input density further increases to reach "28", the image patterns become as shown in FIG. 6(f), when the input density further increases to reach "51", the image patterns become as shown in FIG. 6(g). When the input density further increases to reach "52", the image patterns become as shown in FIG. 6(h).

After the input density becomes "24" and the linear patterns 81C and 81C extend over the entire lengths of the dither matrices Dc1 and Dc2 as shown in FIG. 6(d), when the density further increases, the dot patterns grow in the main scanning direction X as shown in FIG. 6(e). More specifically, when the input density increases from "24" to "25", a dot 83C(e1) is turned ON in the submatrix SM(E). When the input density becomes "26", another dot 83C(o1) is turned ON in the submatrix SM(O). When the input density becomes "27", still another dot 83C(e2) is turned ON in the submatrix SM(E). When the input density becomes "28", as shown in FIG. 6(f), another dot 83C(o2) is turned ON in the submatrix SM(O).

The pair of dots 83C(e1) and 83C(e2) are thus first formed in the submatrix SM(E) on both left and right sides of the solid linear pattern 81C. A line connecting the two dots 83C(e1) and 83C(e2) forms an angle of about 17 degrees. equal to the screen angle α, with respect to the main scanning direction X. Similarly, the pair of dots 83C(o1) and 83C(o2) are thus first formed in the submatrix SM(O) on both left and right sides of the solid linear pattern 81C. A line connecting the two dots 83C(o1) and 83C(o2) forms the same angle of about 17 degrees.

Although not shown in the drawing, as the input density further increases from "28" to "48", dots will be successively formed on both sides of the linear patterns 81C.

When the input density reaches "48", dots in all the cells in the inner side columns C-2 and C-5 are turned ON, thereby producing new linear patterns 81C' (shown in FIG. 6(g)), each of which has a four-dot width.

When the input density further increases from "49" to "72", the dot pattern will further grow in the main scanning direction X as shown in FIGS. 6(g) and 6(h). More specifically, when the input density becomes "49", a dot 85C(e1) is turned ON in the submatrix SM(E). When the input density becomes "50", a dot 85C(o1) is turned ON in the submatrix SM(O). When the input density becomes "51", another dot 85C(e2) is turned ON in the submatrix SM(E). When the input density becomes "52", as shown in FIG. 6(h), another dot 85C(o2) is turned ON in the submatrix SM(O).

The pair of dots 85C(e1) and 85C(e2) are thus first formed in the submatrix SM(E) on both left and right sides of the solid linear pattern 81C'. A line connecting the two dots 85C(e1) and 85C(e2) forms an angle, almost equal to the screen angle α, with respect to the main scanning direction X. Similarly, the pair of dots 85C(o1) and 85C(o2) are thus first formed in the submatrix SM(O) on both left and right sides of the solid linear pattern 81C'. A line connecting the two dots 85C(o1) and 85C(o2) forms the same angle, almost equal to the screen angle α, with respect to the main scanning direction X.

Although not shown in the drawing, as the input density further increases from "52" to "72", dots will be successively formed on both sides of the linear patterns 81C' and 81C'. When the input density reaches "72," dots in all the cells in the outer side columns C-1 and C-6 are turned ON, thereby making all the cells in the dither matrices Dc1 and Dc2 completely solid.

Thus, as the input density increases from "24" to "72", the image pattern grows in the main scanning direction X as shown in FIGS. 6(e)–6(h). Dots are successively turned ON at both sides of the already-formed linear solid pattern at an angle, that is substantially equal to the screen angle α, with respect to the main scanning direction X. Thus, dots will be successively turned ON in a regular fashion, which is appropriate for human visual sense. It is therefore possible to represent the inputted cyan component image accurately.

It is noted that as shown in FIG. 5(b), the dither matrices Dc1 and Dc2 are arranged parallel to the auxiliary scanning direction Y (sheet conveying direction A) without forming any slanted angle with respect to the auxiliary scanning direction Y. Accordingly, image patterns will be formed as being regularly arranged in the sheet conveying direction A. This can ensurely prevent occurrence of jitter.

Next, the dither matrices Dm1 and Dm2 for magenta color will be described with reference to FIGS. 7(a)–8(h) and 12.

Figure 7A:
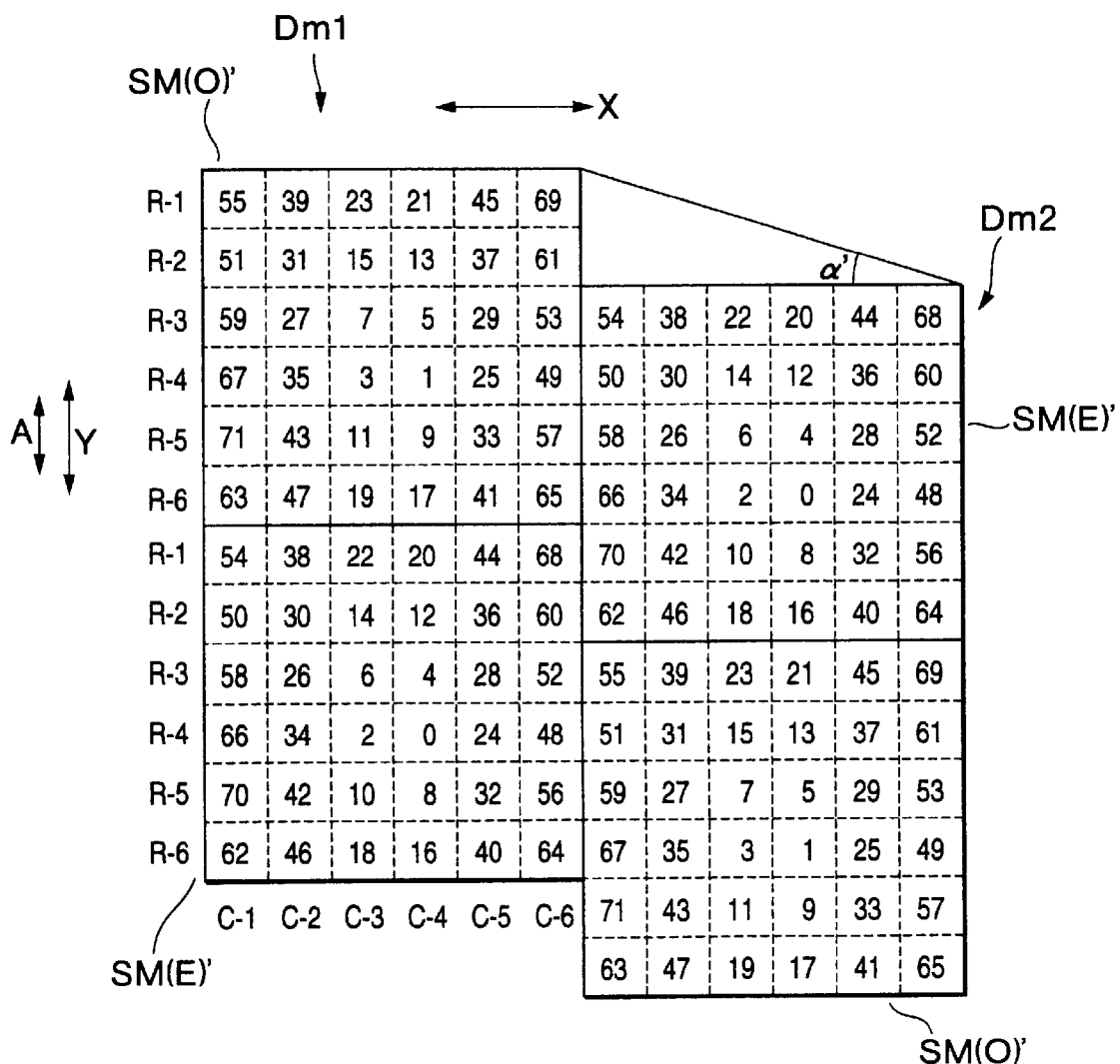
FIG. 7(a) illustrates dither matrices Dm1 and Dm2 used as a basis for forming magenta image patterns according to the first embodiment.

The pair of dither matrices Dm1 and Dm2 show in FIG. 7(a) are for converting multilevel density data Density (DrawX, DrawY) for magenta color into bilevel output data OUTPUT(DrawX, DrawY), thereby converting a multilevel magenta tone image into a bilevel magenta tone image. It is noted that multilevel tone image data Density (DrawX, DrawY) for magenta color represents a magenta color halftone image by 73 discrete cyan tone levels from zero "0" to "72".

Figure 7B:
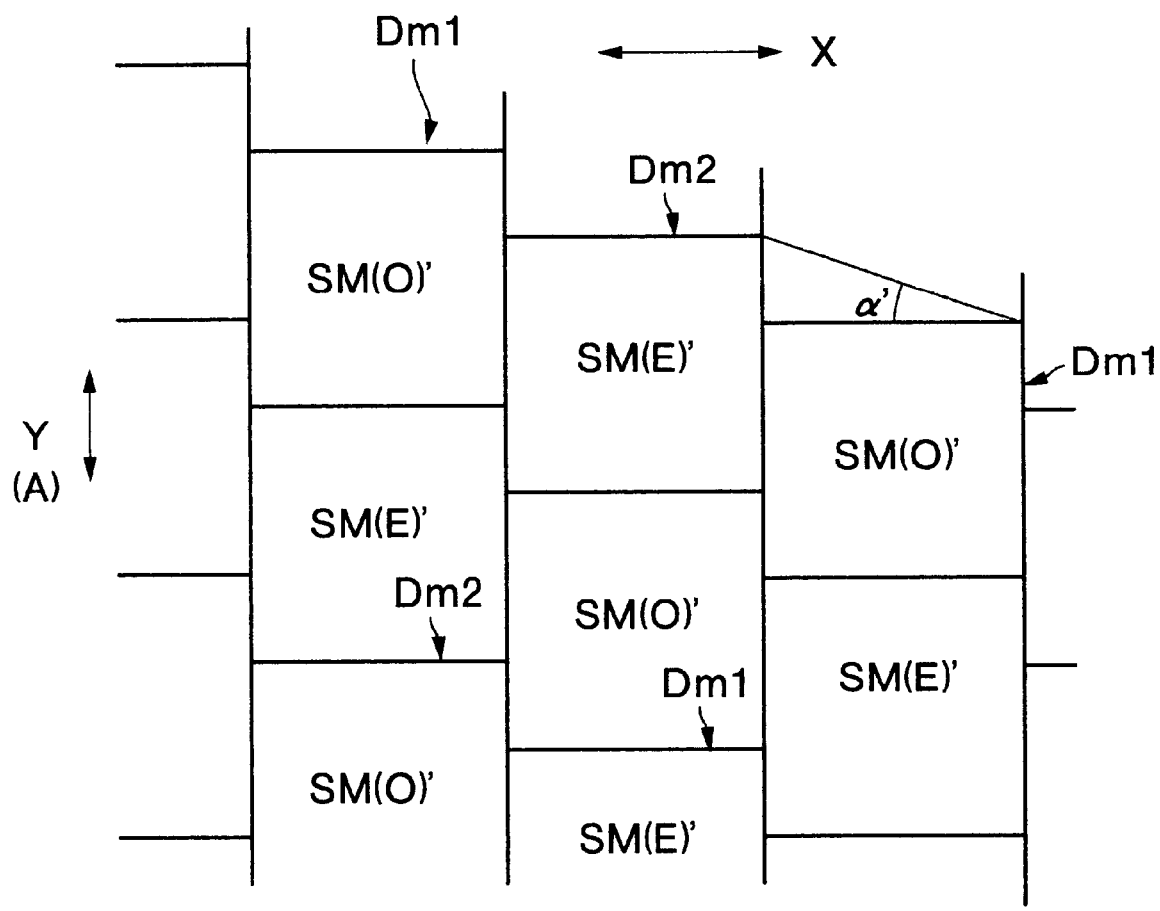
FIG. 7(b) illustrates how the dither matrices Dm1 and Dm2 are repeatedly located on the two-dimensional coordinate plane.

The dither matrices Dm1 and Dm2 are used as being repeatedly laid down over the two-dimensional coordinate plane XY in a repetition manner as shown in FIGS. 7(b) and 12.

As shown in FIG. 7(a), the magenta dither matrices Dm1 and Dm2 have the same shape and the same size with the cyan dither matrices Dc1 and Dc2. That is, each of the magenta dither matrices Dm1 and Dm2 is comprised from a pair of submatrices SM(E)' and SM(O)', each of which is comprised of six rows R-1–R-6 and six columns C-1–C-6. The submatrix SM(E)' has even-numbered threshold values similarly to the cyan dither submatrix SM(E). The submatrix SM(O)' has odd-numbered threshold values similarly to the cyan dither submatrix SM(O).

In the magenta dither matrix Dm1, the odd-numbered threshold value submatrix SM(O)' is located above the even-numbered threshold value submatrix SM(E)' in the drawing of FIG. 7(a). In the other magenta dither matrix Dm2, the submatrix SM(O)' is located below the submatrix SM(E)'. Thus, the dither matrix Dm2 is produced by changing the relative positions of the submatrices SM(E)' and SM(O)' in the auxiliary scanning direction Y.

It is noted that in the already-described cyan dither matrix Dc1, the odd-numbered threshold value submatrix SM(O) is located below the submatrix SM(E) in FIG. 5(a). In the cyan dither matrix Dc2, the submatrix SM(O) is located above the submatrix SM(E) of FIG. 5(a). Thus, the arrangement how the submatrices SM(E)' and SM(O)' are arranged in each magenta dither matrix Dm1 (Dm2) is opposite, along the auxiliary scanning direction Y, to the arrangement how the submatrices SM(E) and SM(O) are arranged in the corresponding cyan dither matrix Dc1 (Dc2). In each of the cyan dither matrices Dc1 and Dc2, the smallest value "0" is located in the submatrix SM(E). Similarly, in each of the magenta matrices Dm1 and Dm2, the smallest value "0" is located in the submatrix SM(E)'. Accordingly, where the smallest value "0" is located in the dither matrix Dm1 is differentiated, along the auxiliary scanning direction Y (sheet conveying direction A), from where the smallest value "0" is located in the dither matrix Dc1. Similarly, where the smallest value "0" is located in the dither matrix Dm2 is differentiated, along the auxiliary scanning direction Y (sheet conveying direction A), from where the smallest value "0" is located in the dither matrix Dc2. Accordingly, the location where a magenta dot will be first turned ON for the smallest magenta input density of "1" is differentiated, in the auxiliary scanning direction Y (sheet conveying direction A), from the location where a cyan dot will be first turned ON for the smallest cyan input density of "1".

As shown in FIGS. 7(a) and 7(b), the magenta dither matrices Dm1 and Dm2 are arranged in the main scanning direction X at a screen angle α' which is about −17 degrees. Thus, the magenta dither matrices Dm1 and Dm2 are arranged as being shifted downwardly in the rightward direction of FIG. 7(a). This is contrary to the cyan dither matrices Dc1 and Dc2 which are arranged as being shifted upwardly in the rightward direction of the FIG. 5(a). Thus, the magenta dither matrices Dm1 and Dm2 are arranged in a symmetrical relationship relative to the cyan dither matrices Dc1 and Dc2. That is, the arrangement how the magenta dither matrices Dm1 and Dm2 are arranged is obtained by inverting the arrangement of the cyan dither matrices Dc1 and Dc2 about an axis extending in the auxiliary scanning direction Y. According to this relationship between the arrangement of the magenta dither matrices Dm1 and Dm2 and the arrangement of the cyan dither matrices Dc1 and Dc2, oyan and magenta images will be formed as being arranged regularly, and therefore will be perceived as appreciable to human visual sense.

Threshold values are arranged in the dither matrices Dm1 and Dm2 as described below.

Similarly to the cyan dither matrices Dc1 and Dc2, threshold values "0" to "71" are arranged in each dither matrix Dm1, Dm2. That is, even-numbered threshold values "0", "2", . . . , and "70" are arranged in each submatrix SM(E)', and odd-numbered threshold values "1", "3", . . . , and "71" are arranged in each submatrix SM(O)'. A location where each threshold value is located in each submatrix SM(E)', SM(O)' is different from the location where the same threshold value is located in the corresponding cyan submatrix SM(E), SM(O). However, the threshold values are arranged in the magenta submatriess SM(E)', SM(O)' according to the same allocating scheme as employed in the cyan submatrices SM(E) and SM(O). In other words, the threshold values are arranged in each magenta submatrices SM(E)', SM(O)' so that when the input density increases from the smallest value "0", a dot pattern formed by turned-ON dots will first grow in the auxiliary scanning direction Y and then grow in the main scanning direction X with a slanted angle, substantially equal to the screen angle α'.

Figure 8A:
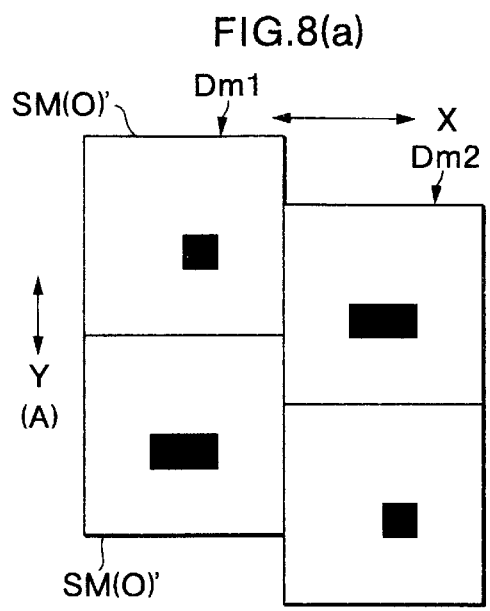
Figure 8B:
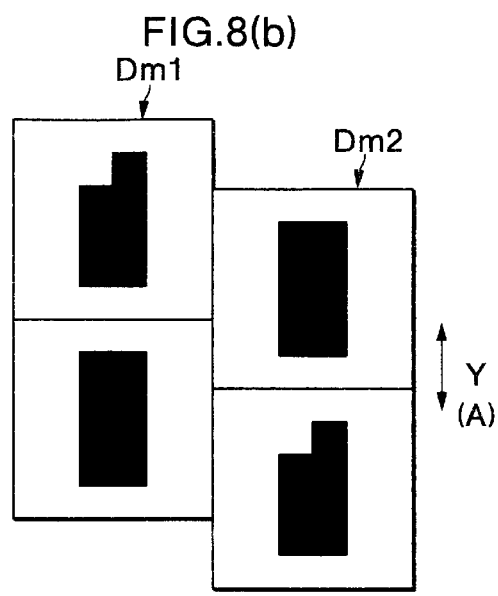
Figure 8C:
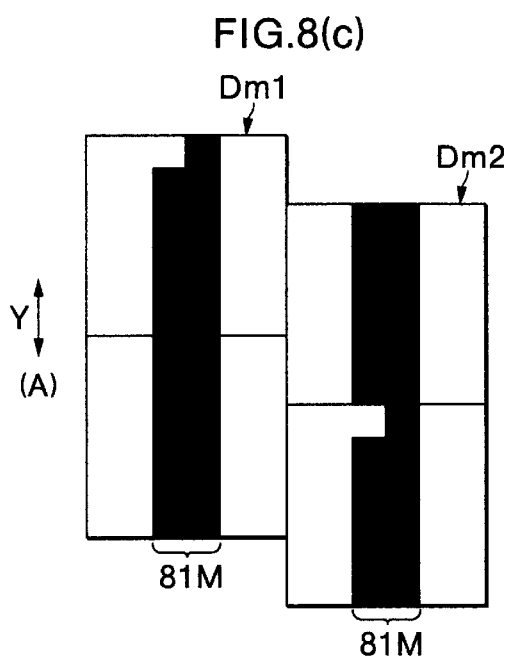
Figure 8D:
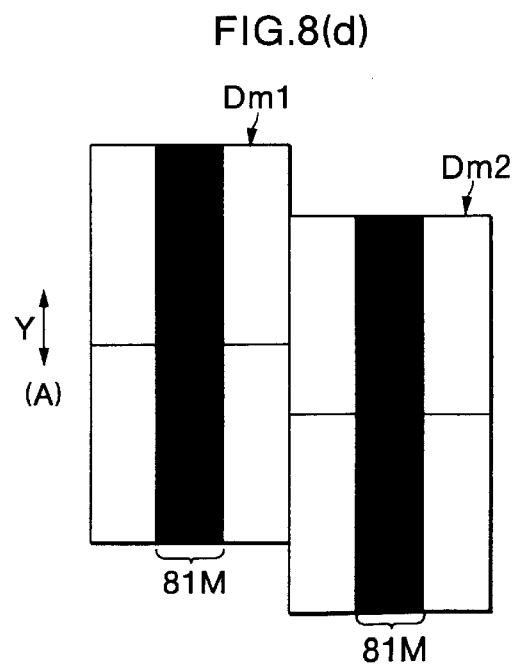

With the above-described arrangement in the submatricos SM(E)' and SM(O)', when a uniform density of "1" is inputted to dot locations corresponding to all the cells in the dither matrices Dc1 and Dc2, a dot is turned ON at a cell that has the smallest threshold value of "0" and that is located almost in the center of the submatrix SM(E)' of each dither matrix Dc1 and Dc2. When the input density increases up to "3", dot patterns are produced as shown in FIG. 8(a). When the input density further increases up to "15", dot patterns are produced as shown in FIG. 8(b). When the input density further increases up to "23", dot patterns are produced as shown in FIG. 8(c). When the input density further increases up to "24", dot patterns are produced as shown in FIG. 8(d). Thus, as the input density increases, the dot pattern in each submatrix SM(E)' and SM(O)' grows in a direction parallel to the auxiliary scanning direction Y (sheet conveying direction A). As the input density increases, linear patterns 81M are produced in the submatrices SM(E) and SM(O) to grow in the auxiliary scanning direction Y (sheet conveying direction A). Each linear pattern 81M has a two-dots' worth of width.

Figure 8E:
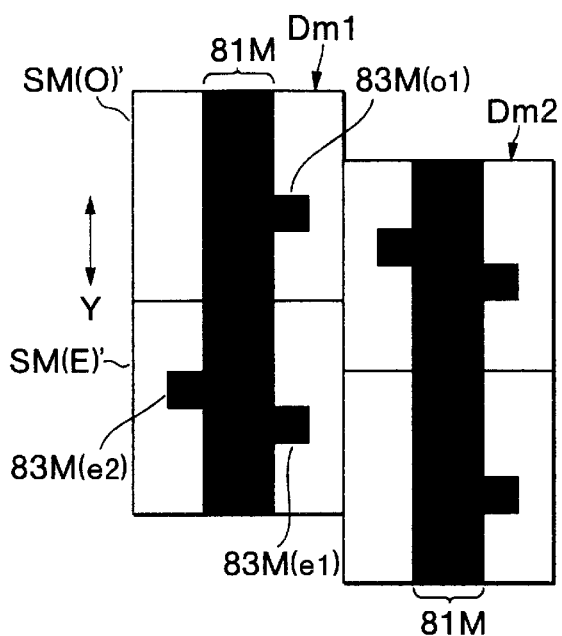
Figure 8F:
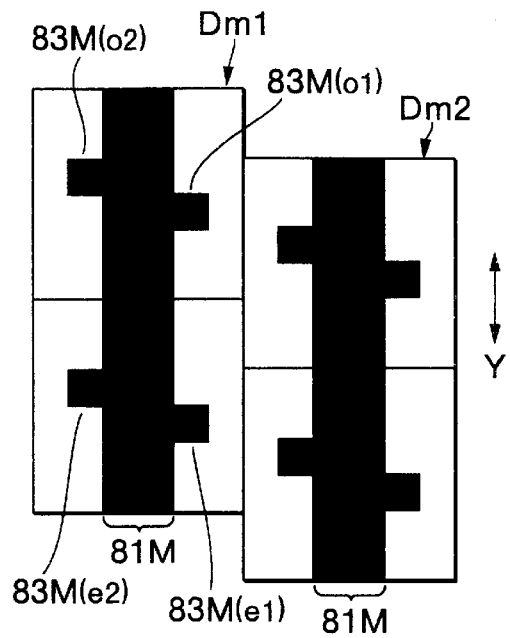
Figure 8G:
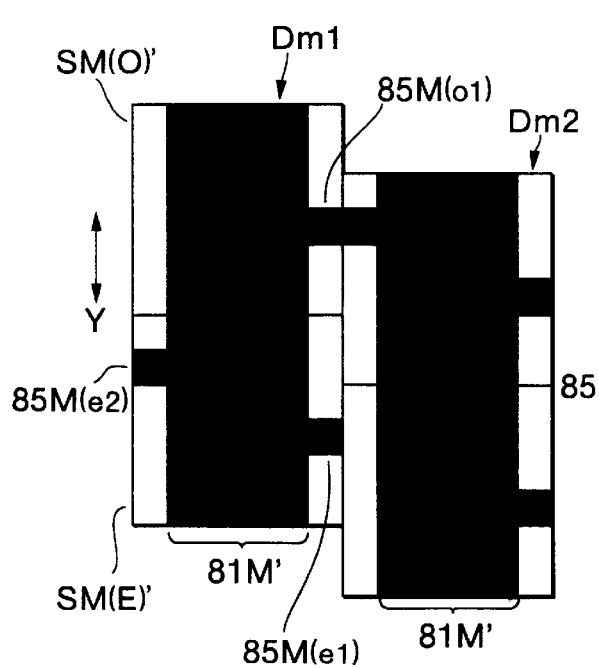
Figure 8H:
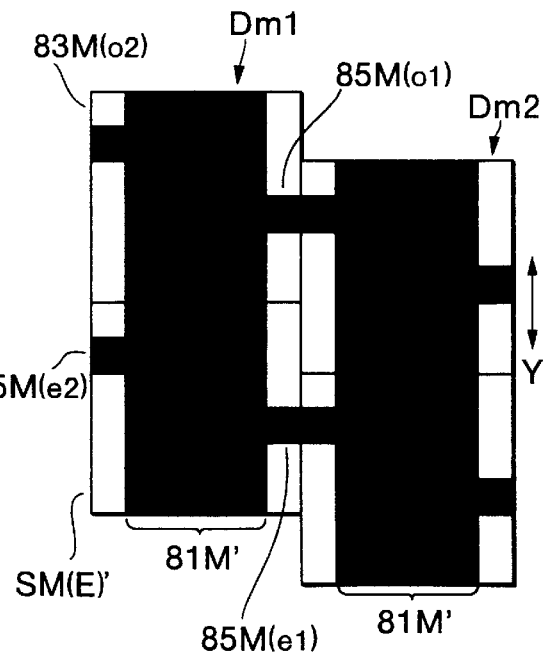

As the input density further increases, the image patterns will grow in the main scanning direction X. That is, when the input density increases to reach "27", the image patterns become as shown in FIG. 8(e). When the input density further increases to reach "28", the image patterns become as shown in FIG. 8(f), when the input density further increases to reach "51", the image patterns become as shown in FIG. 8(g). When the input density further increases to reach "52", the image patterns become as shown in FIG. 8(h).

Thus, when the input density increases from "24" to "25", a dot 83M(e1) is turned ON in the submatrix SM(E)'. When the input density becomes "26", another dot 83M(o1) is turned ON in the submatrix SM(O)'. When the input density becomes "27", still another dot 83M(e2) is turned ON in the submatrix SM(E)'. When the input density becomes "28", as shown in FIG. 8(f), another dot 83M(o2) is turned ON in the submatrix SM(O)'. The pair of dots 83M(e1) and 83M(e2) (83M(o1) and 83M(o2)) are thus first formed in each submatrix SM(E)' (SM(O)') on both left and right sides of the solid linear pattern 81M. A line connecting the two dots forms an angle of about −17 degrees, equal to the screen angle α', with respect to the main scanning direction X.

Although not shown in the drawing, when the input density reaches "48," dots in all the cells in the inner side columns C-2 and C-5 are turned ON, thereby producing new linear patterns 81M', each of which has a four-dot width. When the input density becomes "49", a dot 85M(e1) is turned ON in the submatrix SM(E)'. When the input density becomes "50", a dot 85M(o1) is turned ON in the submatrix SM(O)'. When the input density becomes "51", another dot 85M(e2) is turned ON in the submatrix SM(E)'. When the input density becomes "52", as shown in FIG. 8(h), another dot 85(o2) is turned ON in the submatrix SM(O)'.

The pair of dots 85M(e1) and 85M(e2) (85M(o1) and 85M(o2)) are thus first formed in each submatrix SM(E)' (SM(O)') on both left and right sides of the solid linear pattern 81M'. A line connecting the two dots forms an angle, almost equal to the screen angle α', with respect to the main scanning direction X.

Thus, the orientation α' how the magenta dot pattern grows from the magenta solid line 81M (81M') is differentiated from the orientation α how the cyan dot pattern grows from the cyan solid line 81C as shown in FIGS. 6(e)–6(h). Due to this difference in the orientation of the dot patterns, cyan and magenta dot positions will be dispersed regularly. Undesirable mixture of cyan and magenta dots can be properly avoided. Reproducibility of cyan and magenta color can be enhanced.

It is noted that as apparent from FIGS. 5(a) and 7(a), a location where each threshold value is located in each magenta dither matrix Dm1, Dm2, is different from the location where the same threshold value is located in each cyan dither matrix Dc1, Dc2. Accordingly, in order to reproduce a combined color of cyan and magenta, cyan dots and magenta dots will be located adjacent to but not overlapped with one another. The combined color can be reproduced vividly.

As apparent from FIG. 12, the magenta dither matrices Dm1 and Dm2 are repeatedly laid down over the two-dimensional coordinate plans XY of FIG. 4 as being shifted from the cyan dither matrices Dc1 and Dc2 in the main scanning direction X by a three dot's worth of distance.

Accordingly, threshold values for magenta color are distributed in a different fashion from those for cyan color. Especially, small threshold values for magenta color are located as being shifted from small threshold values for cyan color. Accordingly, where dot(s) will be turned ON for small densities of magenta color is shifted from where dot(s) will be turned ON for small densities for cyan color.

For example, the location, where the threshold value "0" of each magenta dither matrix Dm1 and Dm2 is located, is different, in the main scanning direction X, from the location, where the threshold value "0" of each cyan dither matrix Dc1 and Dc2 is located. Accordingly, the location where a magenta dot will be first turned ON for the magenta density of "1" is differentiated. In the main scanning direction X, from the location where a cyan dot will be first turned ON for the cyan density of "1". Reproducibility of images can therefore be enhanced especially for those smallest density regions.

Figure 13:
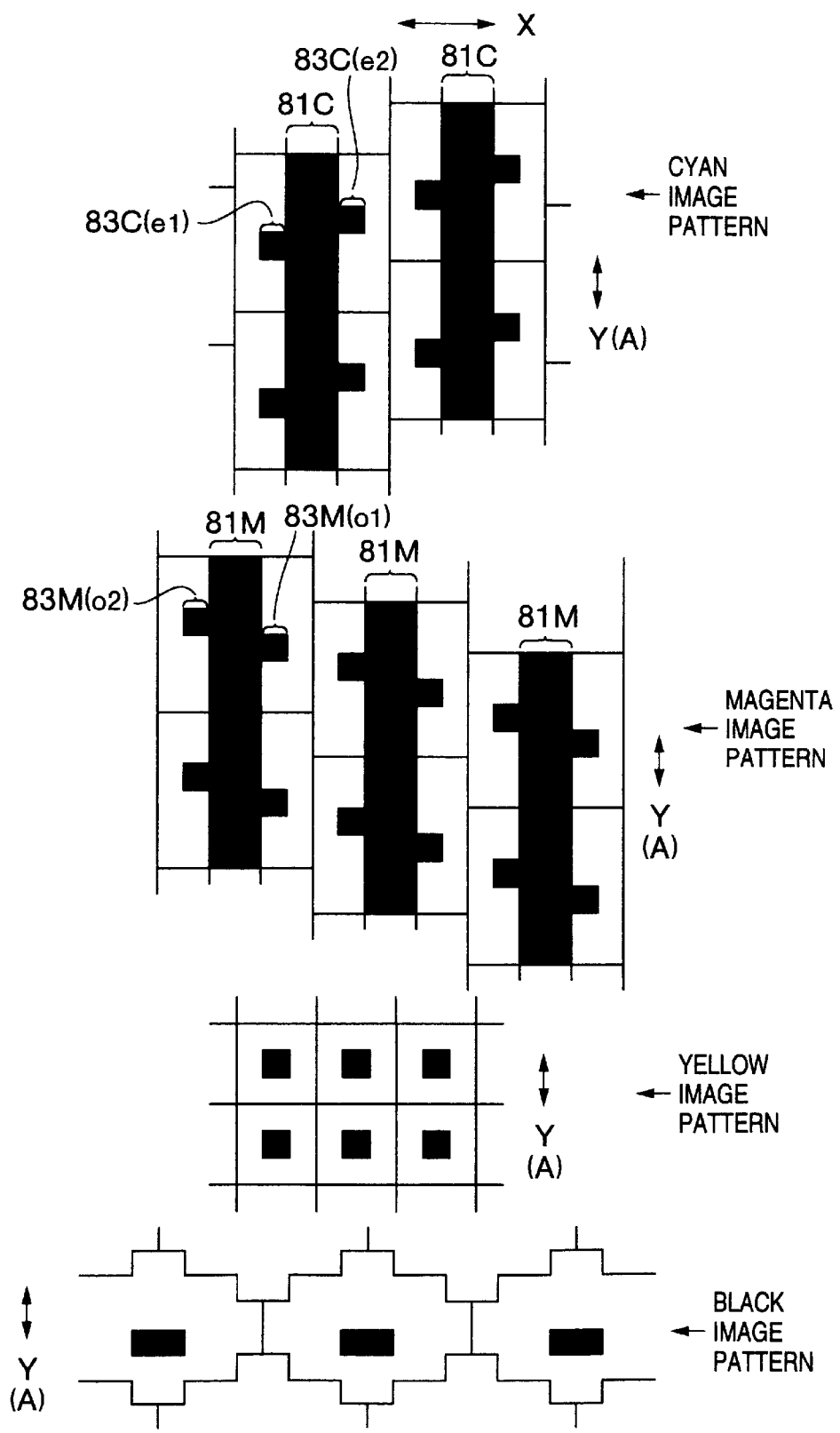
FIG. 13 illustrates a state how cyan, magenta, yellow, and black image patterns are produced based on the cyan dither matrices Dc1 and Dc2, the magenta dither matrices Dm1 and Dm2, the yellow dither matrix Dy, and the black dither matrix Db.

In addition, because the magenta dither matrices Dm1 and Dm2 are shifted by the three dots' worth distance from the cyan dither matrices Dc1 and Dc2, the location where the magenta solid pattern 81M is formed by each magenta dither matrix Dm1, Dm2 is also shifted in the main scanning direction X from the location where the cyan solid pattern 81C is formed by each cyan dither matrix Dc1, Dc2. That is, as shown in FIG. 13, the cyan solid line 81C and the magenta solid line 81M are located to have a complementary relationship so that cyan and magenta colors will not be mixed up until the input magenta and cyan densities increase up to the value of 24. It is noted that cyan and magenta colors have strong influences on other colors when being located as overlapped with other colors. It is preferable that those colors not interfere with each other when densities of those colors are as small as 24 or lower values. According to the present embodiment, because cyan and magenta dots will not be overlapped with each other while their input densities are equal to or lower than 24, it is possible to highly accurately reproduce each color in such a thin color state equal to or lower than 24.

In addition, because the matrices Dm1 and Dm2 are positioned as being shifted from the matrices Dc1 and Dc2 in the main scanning direction X, locations where magenta dots will be first formed on both sides of the linear solid pattern 81M are also differentiated in the main scanning direction X from the locations where cyan dots will be first formed on both sides of the cyan linear pattern 81C. Reproducibility of images can be further enhanced even not in the color thin state.

Next, the yellow dither matrix Dy will be described with reference to FIG. 9(a) through 10(f) and 12.

Figure 9A:
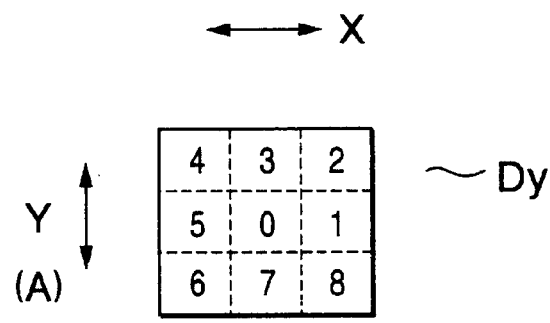
FIG. 9(a) illustrates a dither matrix Dy used as a basis for forming an yellow image pattern according to the first embodiment.

The dither matrix Dy shown in FIG. 9(a) is for converting multilevel density data Density(DrawX, DrawY) for yellow color into bilevel output data OUTPUT(DrawX, DrawY), thereby converting a multilevel yellow tone image into a bilevel yellow tone image. It is noted that multilevel tone image data Density (DrawX, DrawY) for yellow color represents a yellow color halftone image by ten discrete yellow tone levels from zero "0" to "9".

Figure 9B:
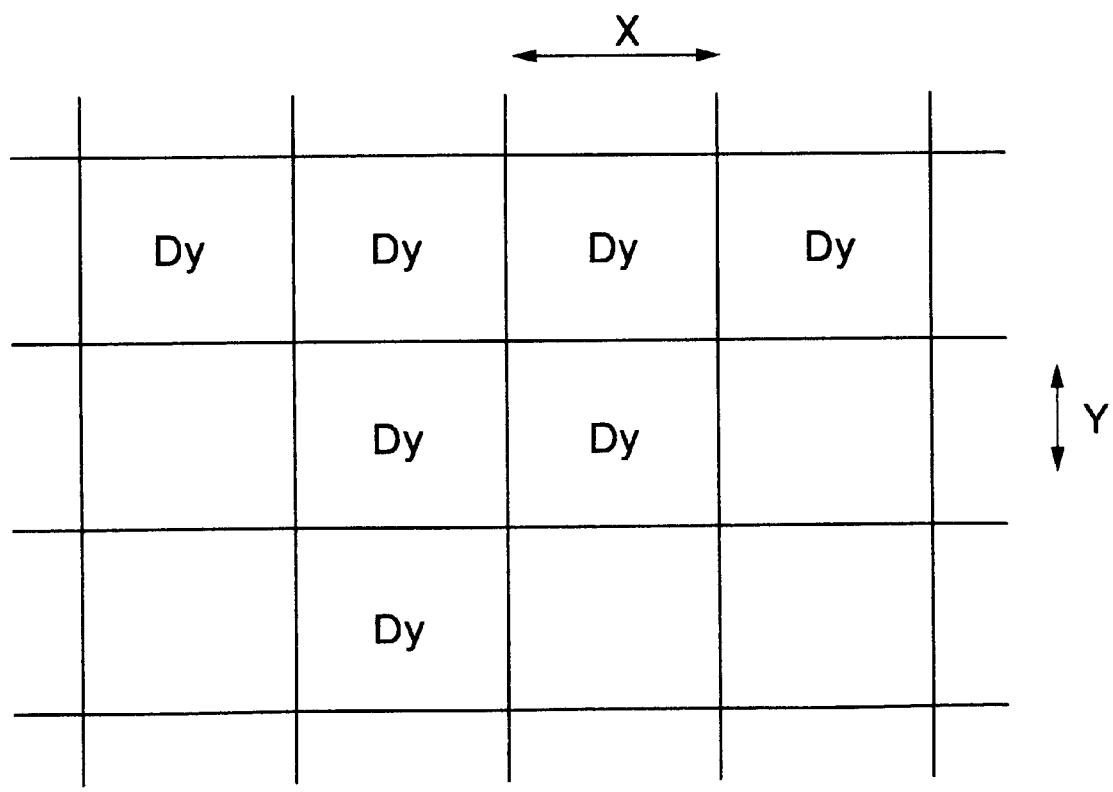
FIG. 9(b) illustrates how the dither matrix Dy is repeatedly located on the two-dimensional coordinate plane.

The yellow dither matrix Dy is used as being repeatedly laid down over the two-dimensional coordinate plane XY in a repetition manner as shown in FIGS. 9(b) and 12.

As shown in FIG. 9(a), the yellow dither matrix Dy is of a square shape and is constructed from nine cells. The yellow dither matrix Dy has three rows in the auxiliary scanning direction Y (sheet conveying direction A), and three columns in the main scanning direction X. The yellow dither matrix Dy can therefore produce ten different tones by selectively turning dots ON and OFF on the nine cells.

As shown in FIGS. 9(b) and 12, the yellow dither matrix Dy is repeatedly located over the two-dimensional coordinate plans XY at a screen angle of zero (0) degree.

Figure 10A:
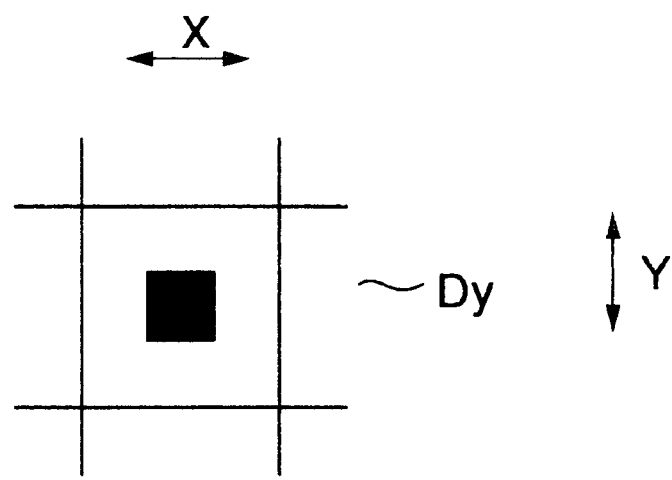
Figure 10B:
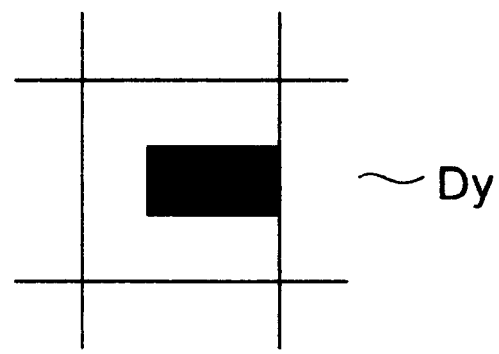
Figure 10C:
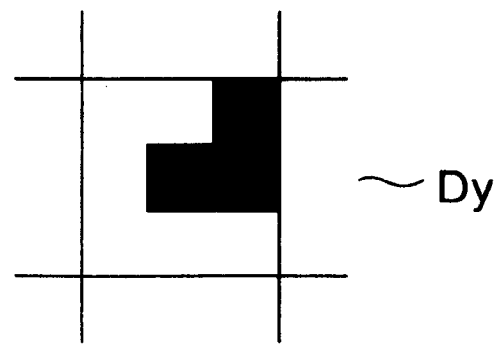

As shown in FIG. 9(a), nine threshold values "0" through "9" are arranged in the yellow dither matrix Dy. Accordingly, if a uniform yellow density is inputted for the region corresponding to the entire dither matrix Dy, a corresponding yellow dot pattern will be produced by yellow dots that are turned ON by the matrix Dy. As apparent from FIG. 9(a), the yellow dither matrix Dy has a threshold arrangement in which the threshold value increases spirally outwardly from the center location of the dither matrix Dy. Accordingly, as the input density gradually increases, the dot pattern gradually grows from the center location spirally outwardly. More specifically, when the yellow input density is "1", a dot is turned ON only at the central cell as shown in FIG. 10(a). When the yellow input density increases to "2", two dots are turned ON as shown in FIG. 10(b). When the yellow input density is "3", three dots are turned ON as shown in FIG. 10(c). When the yellow input density is "5", five dots are turned ON as shown in FIG. 10(d). When the yellow input density increases to "7", seven dots are turned ON as shown in FIG. 10(e). When the yellow input density is "8", eight dots are turned ON as shown in FIG. 10(f). Thus, as the input density increases, the yellow dot image pattern gradually grows from the state of FIG. 10(a), through the states of FIGS. 10(b)–10(e), to the state of FIG. 10(f).

It is noted that the yellow dither matrix Dy is repeatedly located over the two-dimensional coordinate plane XY as shown in FIG. 12 relative to the cyan and magenta dither matrices Dc1, Dc2 and Dm1, Dm2 in the main scanning direction X. With this arrangement, the location, where the threshold value "0" of each yellow dither matrix is located, is different in the main scanning direction X from the location, where the threshold values "0" of the cyan and magenta dither matrices Dc and Dm are located. Accordingly, where the yellow dot will be first turned ON for the yellow density of "1" is different, in the main scanning direction X, from where cyan and magenta dots will be first turned ON for the cyan and magenta densities of "1".

As described already, threshold values of the magenta dither matrices Dm1 and Dm2 are distributed differently from those of the cyan dither matrices Dc1 and Dc2. Especially, locations where small threshold values are located in the magenta dither matrices Dm1 and Dm2 are shifted from locations where small threshold values are located in the cyan dither matrices Dc1 and Dc2. It is noted that threshold values of the yellow dither matrices Dy are distributed also differently from both of those of magenta and cyan dither matrices. More specifically, small threshold values of the yellow dither matrices are located between the locations where small threshold values of the magenta dither matrix are located and the locations where small threshold values of the cyan dither matrices are located. Accordingly, yellow color, that has small influence onto other colors when being overlapped on other colors, will not be mixed with cyan or magenta when the yellow input density is low. Accordingly, yellow color halftone can also be reproduced with high accuracy.

It is noted that as apparent from FIG. 12, the yellow dither matrix Dy has a size smaller than the cyan and magenta dither matrices Dc and Dm. The yellow dither matrix Dy is repeatedly arranged at a smaller interval than the cyan and magenta dither matrices Dc and Dm. Accordingly, the yellow dither matrix Dy is repeatedly arranged within the single region occupied by each of the cyan and magenta dither matrices Dc and Dm. This arrangement can be employed because yellow color does not appear strongly relative to cyan and magenta.

Next, the black dither matrix Db will be described below with reference to FIGS. 11(a) and 11(b) and 12.

Figure 11A:
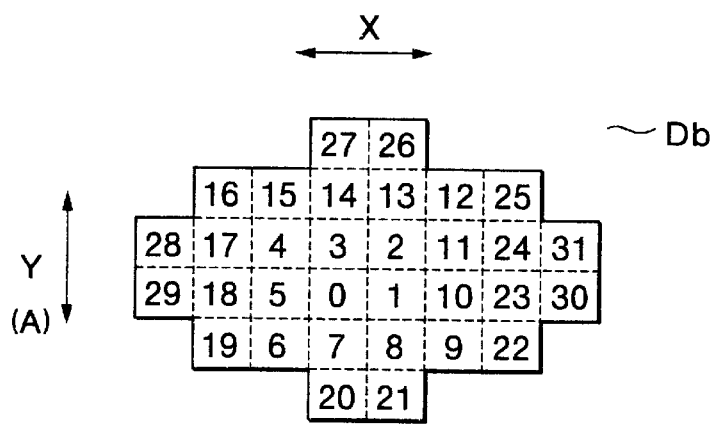
FIG. 11(a) illustrates a dither matrix Db used as a basis for forming a black image pattern according to the first embodiment.

The dither matrix Db shown in FIG. 11(a) is for converting multilevel density data Density(DrawX, DrawY) for black color into bilevel output data OUTPUT(DrawX, DrawY), thereby converting a multilevel black tone image into a bilevel black tone image. It is noted that multilevel tone image data Density (DrawX, DrawY) for black color represents a black color halftone image by 33 discrete black tone levels from zero "0" to "32".

Figure 11B:
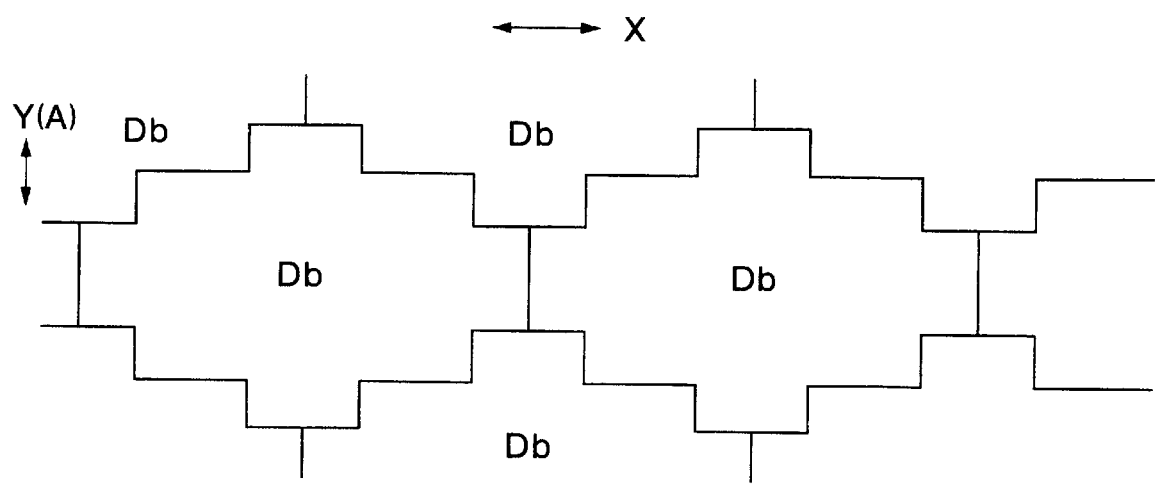
FIG. 11(b) illustrates how the dither matrix Db is repeatedly located on the two-dimensional coordinate plane.

The black dither matrix Db shown in FIG. 11(a) is used as being repeatedly laid down over the two-dimensional coordinate plane XY in a repetition manner as shown in FIGS. 11(b) and 12.

The black dither matrix Db is constructed from 32 cells in total that are arranged in six rows and in eight columns. The black dither matrix Db is repeatedly arranged over the two-dimensional coordinate plane XY as shown in FIGS. 11(b) and 12 at a screen angle of 45 degrees. The black dither matrix Db is repeatedly located over the two-dimensional coordinate plane XY as shown in FIG. 12 relative to the cyan, magenta, and yellow dither matrices Dc, Dm, and Dy in the main scanning direction.

Next will be given a detailed explanation how cyan, magenta, yellow, and black dot patterns are produced for the same region of an input image. It is assumed that the input image has a uniform color at the subject region. In other words, the input density Density(DrawX, DrawY) for the subject region has a uniform value. In this example, the density value Density(DrawX, DrawY) for cyan color is equal to 28. The density value Density(DrawX, DrawY) for magenta color is also equal to 28. The density value Density (DrawX, DrawY) for yellow color is equal to 1. The density value Density(DrawX, DrawY) for black color is equal to 2.

Each of the cyan, magenta, yellow, and black dither matrices Dc (Dc1 and Dc2), Dm (Dm1 and Dm2), Dy, and Db is repeatedly located over the two-dimensional coordinate plane XY, with the relative positions therebetween in the main scanning direction X being as shown in FIG. 12, so that the input multilevel tone image Density(DrawX, DrawY) for each color is converted into a bilevel image OUTPUT(DrawX, DrawY). It is noted that although the respective arrangement patterns of FIG. 12 are positioned differently in the vertical direction of the drawing, they are actually located as being overlapped one on another on the same region in the vertical direction (auxiliary scanning direction Y). As a result, cyan, magenta, yellow, and black dot images (bilevel images) OUTPUT(DrawX, DrawY) are produced as shown in FIG. 13. It is noted that the respective image patterns of FIG. 13 are positioned differently in the vertical direction of the drawing, they are actually produced as being overlapped one on another on the same region in the vertical direction (auxiliary scanning direction Y). Those image patterns of FIG. 13 are therefore reproduced in the same region on the sheet of paper in the sheet conveying direction A. It is noted that the relative positions between the respective image patterns in the main scanning direction X corresponds to the positional relationship actually obtained on the two-dimensional coordinate plane XY.

As apparent from FIG. 13, the cyan line patterns 81C are positioned slightly shifted from the magenta line patterns 81M in the main scanning direction X. This is because the cyan and magenta dither matrices are arranged as shown in FIG. 12 as being shifted from one another by three dots' worth of distance in the main scanning direction. Accordingly, combined color of cyan and magenta color will be appropriately reproduced on the sheet of paper.

It is noted that data of the dither matrices Dc1 and Dc2, Dm1 and Dm2, Dy, and Db are stored in the ROM 69 (FIG. 3) in a manner described below.

In order to attain high speed processing, a single large and rectangular dither array "DithArray" is defined for each of cyan, magenta, and black color. The single large dither array has a size equal to an interval, at which the same threshold arrangement appears in the main scanning direction X. During the image forming process of FIG. 15, data of this single large dither array "DithArray" is repeatedly located over the two-dimensional coordinate plane XY in a repetition manner.

Figures 14A, 14B:
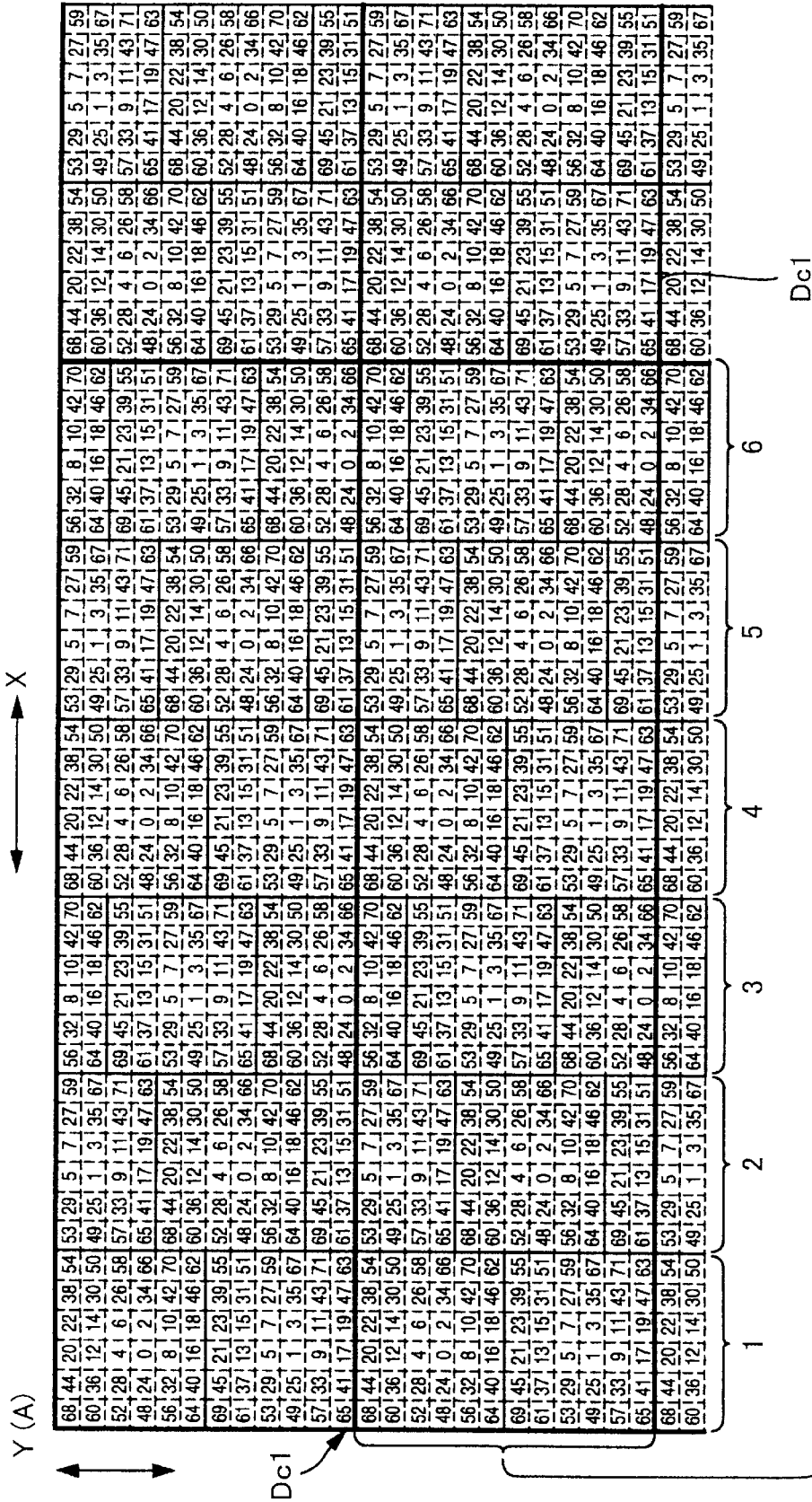
FIG. 14, represented by FIGS. 14(a)–12(b), illustrate how a single large dither array dithArray is produced for cyan based on the cyan dither matrices Dc1 and Dc2.

For example, when the cyan dither matrices Dc1 and Dc2 of FIG. 5(a) are repeatedly arranged as shown in FIG. 12, the same threshold value arrangement appears when each of the dither matrices Dc1 and Dc2 is shifted six successive times in the main scanning direction X as shown in FIG. 14. Accordingly, a single large dither array "dithArray" is prepared for cyan as also shown in FIG. 14 to have twelve rows and 36 columns. A height "dithHeight" of this dithArray is equal to 12, and a width "dithwidth" of this dithArray is equal to 36. This cyan dither array can be indicated as dithArray[36][12]. A threshold value in each cell location [X, Y] (where $0 \leq x \leq 35$, $0 \leq Y \leq 11$) in the cyan dither array is indicated by "dithArray[X][Y]". This single large dither array "dithArray" for cyan is stored in the ROM 69.

Similarly, although not shown in the drawing, for the magenta dither matrices Dm1 and Dm2 of FIG. 7(a), a single large magenta dither array is prepared to have twelve rows and 36 columns similarly to the cyan dither array of FIG. 14. That is, a height "dithHeight" of this dithArray is equal to 12, and a width "dithwidth" of this dithArray is equal to 36. This magenta dither array can therefore be indicated also as dithArray[36][12]. A threshold value in each dot location [X, Y] (where $0 \leq x \leq 35$, $0 \leq Y \leq 11$) in the dither array is also indicated by dithArray[X][Y]. The magenta dither array is stored also in the ROM 69.

Although not shown in the drawing, for the black dither matrix Db of FIG. 11(a), a single rectangular-shaped black dither array is determined. The black dither array has eight rows and eight columns and entirely includes the dither matrix Db of FIG. 11(b). Accordingly, a height "dithHeight" of this dithArray is equal to 8, and a width "dithwidth" of this dithArray is equal to 8. This black dither array can therefore be indicated as dithArray[8][8]. A threshold value in each dot location [X, Y] (where $0 \leq x \leq 7$, $0 \leq Y \leq 7$) in the dither array is indicated by dithArray[X][Y].

It is noted that data of the single yellow dither matrix Dy of FIG. 9(a) is stored in the ROM 69 as an yellow dither array. Accordingly, a height "dithHeight" of this dithArray is equal to 3, and a width "dithwidth" of this dithArray is equal to 3. This yellow dither array can therefore be indicated as dithArray[3][3]. A threshold value in each dot location [X, Y] (where $0 \leq x \leq 2$, $0 \leq Y \leq 2$) in this dither array is indicated by dithArray[X][Y].

With using the dither arrays of the above-described structure, the laser printer 1 produces a pseudo-halftone color image through executing the image forming program stored in the ROM 69. That is, the CPU 71 executes the image forming process of FIG. 15 onto color data Density (DrawX, DrawY) for each of cyan, magenta, yellow, and black. The color data Density(DrawX, DrawY) has been received from outside and is temporarily stored in the RAM 67.

Following explanation will be given for forming a cyan color image using the color input data Density(DrawX, DrawY) for cyan. The same operations are executed for other colors.

In S10, the CPU 71 first retrieves, from the ROM 69, data of a value of width "dithWidth" and height "dithHeight" of the cyan dither array dithArray[36][12] shown in FIG. 14. In this case, "dithWidth" is equal to 36, and "dithHeight" is equal to 12.

In S20, the CPU 71 determines a location [dithOrgX, dithOrgY] indicative of an original position (DrawX, DrawY) defined on the two-dimensional coordinate plane XY of FIG. 4. From the original position, the cyan dither array dithArray will be repeatedly located over the two-dimensional coordinate plans XY.

Then, in S30, the CPU 71 retrieves, from the RAM 67, cyan density data Density(DrawX, DrawY) for each dot location (DrawX, DrawY). In this case, data Density (DrawX, DrawY) has an integer value within a range of zero (0) to 72.

Next, in S40, the CPU 71 determines which cell [X, Y], in the cyan dither array dithArray[X][Y], will correspond to each dot location (DrawX, DrawY) when the cyan dither array dithArray[36][12] is repeatedly located over the two-dimensional coordinate plane XY. This determination is performed by calculating the following formulas:

$$X = (DrawX - dithOrgX) \% \text{ dithwidth},$$

and $$Y = (DrawY - dithOrgY) \% \text{ dithHeight}$$

where % is an operator for calculating a remainder produced when a value appearing preceding the operator % is divided by another value appearing following the operator %.

In S50, a density value "Density(DrawX, DrawY)" of each dot location (DrawY, DrawX) is compared with a threshold value "dithArray[X][Y]" that is located at the calculated cell location [X, Y] in the cyan dither array dithArray[36][12]. When the value of "Density(DrawY, DrawX) is greater than the threshold value "dithArray[X][Y]", the CPU 71 produces output data OUTPUT(DrawX, DrawY) of one (1) for turning a dot ON at the subject dot location (DrawX, DrawY). When Density(DrawY, DrawX) is smaller than or equal to the threshold value "ditthArray[X][Y]", the CPU 71 produces output data OUTPUT (DrawX, DrawY) of zero (0) for turning a dot OFF at the subject dot location (DrawX, DrawY). The above-described operation is executed for all the dot locations (DrawX, DrawY).

The thus produced output data OUTPUT(DrawX, DrawY) is then supplied through the engine interface 61 to the engine controller 35. In the engine controller 35, the CPU 49 executes a well-known printing program (not shown) stored in the ROM 39 to control the laser controller 45 and the print engine 79 based on the output data OUTPUT(DrawX, DrawY). That is, the CPU 49 controls the laser controller 45 to modulate the laser source 43. The CPU 49 controls the motors 53, 55, and 51 to drive the toner cartridge 5, the polygon mirror, and the photosensitive drum 7, the sheet feeding mechanism (19 and 21), and the processing mechanism (23, 11, and 15), and the like.

Mare specifically, the laser source 43 is pulse-width modulated by the output data OUTPUT(DrawX, DrawY) so as to control the period of time, during which the laser beam is to be irradiated at each dot location on the photosensitive is drum 7. That is, when receiving output data OUTPUT (DrawX, DrawY) of one (1), the laser source 43 is controlled to radiate the laser beam to the subject dot location (DrawX, DrawY) for a predetermined long period of time so that toner can be attached to that dot location. When receiving output data OUTPUT(DrawX, DrawY) of zero (0), the laser source 43 is controlled to radiate the laser beam to the subject dot location (DrawX, DrawY) for a shorter period of time so that toner may not be attached to that dot location. As a result, a latent image is formed on the photosensitive drum 7.

The toner cartridge 5 is driven by the toner supply motor 53 to supply toner of cyan to the photosensitive drum 7. As a result, the latent image is developed by cyan toner, to thereby form a corresponding cyan color image. In the thus formed cyan tone image, a dot location where toner is attached represents a high density, while another dot location where toner is not attached represents a low density. The thus developed cyan color image is then transferred onto the image transfer drum 9.

One sheet of paper is picked up at a time by the pick up roller 19 from the sheet cassette 17. The sheet of paper is conveyed along the predetermined sheet conveying path 20 in the sheet conveying direction A. The sheet of paper passes between the pair of positioning rollers 21, and the feed amount of the sheet of paper is controlled by the positioning rollers 21. The sheet of paper is then pressed against the image transfer drum 9 by the image transfer roller 23. The electric charger 11 serves to transfer toner from the image transfer drum 9 onto the surface of the sheet of paper. The cyan color image is thus transferred onto the sheet of paper that is being conveyed on the sheet transport path 20 in the sheet conveying direction A. The cyan color image is formed on the sheet of paper in an orientation that the auxiliary scanning, direction Y in the two-dimensional coordinate plans XY be parallel to the sheet conveying direction A. Accordingly, when images are formed on the sheet of paper as shown in FIG. 13, for example, the dot line images 81C and 81M extend parallel to the sheet conveying direction A. Even when the sheet is oscillated in the sheet conveying direction A while being conveyed, no undesirable bandings or stripes will be formed.

The same operations as described above are executed for magenta data, yellow data, and black data, thereby forming corresponding magenta, yellow, and black color images. All the cyan, magenta, yellow, and black color images will then be transferred onto the same sheet of paper, according to the same coordinate space XY, to thereby form a color dot image. When images are formed on the sheet of paper as shown in FIG. 13, for example, the cyan line patterns 81C are positioned slightly shifted from the is magenta line patterns 81M in the main scanning direction X. Accordingly, combined color of cyan and magenta color will be appropriately reproduced on the sheet of paper.

Thus, according to the present embodiment, bilevel image patterns OUTPUT(DrawX, DrawY) of four colors are produced using the dither matrices D (Dc1 and Dc2, Dm1 and Dm2, Dy, and Db). The color image patterns OUTPUT (DrawX, DrawY) are printed on the sheet of paper. The thus produced image patterns will change in accordance with an input image density "Density". For example, as the cyan input density increases from "3" to "52", the cyan image patterns change from the state of FIG. 6(*a*) through the state of FIG. 6(*b*)–6(*g*) to the state of FIG. 6(*h*). Thus, as the input density increases, the linear patterns are first formed to grow in a direction parallel to the sheet conveying direction A. Accordingly, even when mechanical oscillation occurs in the sheet conveying direction A, no changes in tone will appear. When the input density further increases from the state of FIG. 6(*d*), the linear patterns will grow both in leftward and rightward directions X. Because each dither matrix Dc1, Dc2 is elongated in the auxiliary scanning direction Y (sheet conveying direction A), the linear patterns grow in the leftward and rightward directions only after the input density increases to some great value (24, in this example). It is therefore possible to effectively prevent occurrence of jitter.

It is noted that data Density(DrawX, DrawY) has been prepared in external devices 100 so that the input image defined by data Density(DrawX, DrawY) be constructed from a plurality of pixel areas. Each pixel area is defined as represents a single halftone color. Each pixel area is comprised of a single dot location (DrawX, DrawY).

However, each pixel area may be comprised of a plurality of dot locations that are adjacent to one another. For example, each pixel area may be defined as being comprised of 72 dot locations that are arranged in twelve rows and in six columns in the same manner as the cyan and magenta dither matrices. In this case, data Density (DrawX, DrawY) for the 72 dot locations, within the single pixel area, is prepared to have the same value.

Or, the size of each pixel area may be defined differently for each color in correspondence with the size and shape of a corresponding color dither matrix used. For example, each pixel area for each of cyan and magenta colors may be defined as a rectangular shape comprised of 72 dot locations in the same manner as shown in FIGS. 5(*a*) and 7(*a*). Each pixel area for yellow color may be defined as a square shape comprised of nine dot locations in the same manner as shown in FIG. 9(*a*). Each pixel area for black color may be defined as a diamond shape comprised of 32 dot locations in the same manner as shown in FIG. 11(*a*).

Second Embodiment

In the first embodiment, the yellow dither matrix Dy of FIG. 9(a) is prepared so that an yellow dot image pattern will grow spirally outwardly from the center portion of the yellow dither matrix Dy. However, the yellow dither matrix Dy can be constructed in the same manner as the cyan and magenta dither matrices so that the dot image pattern will first grow in the auxiliary scanning direction Y (sheet conveying direction A). With this arrangement, it is possible to minimize the undesirable mixture of yellow color with cyan and magenta colors when the input density is small. Reproducibility of thin colors can be enhanced.

Third Embodiment

In accordance with a color tonal state of yellow toner, the yellow dither matrix Dy can be elongated in the sheet conveying direction Y in the same manner as in the cyan and magenta matrices of FIGS. 5(a) and 7(a). This rectangular-shaped yellow dither matrix Dy is appreciated when an input image has a state that chroma or saturation of yellow is high and is vivid in yellow color.

Fourth Embodiment

Figure 16:
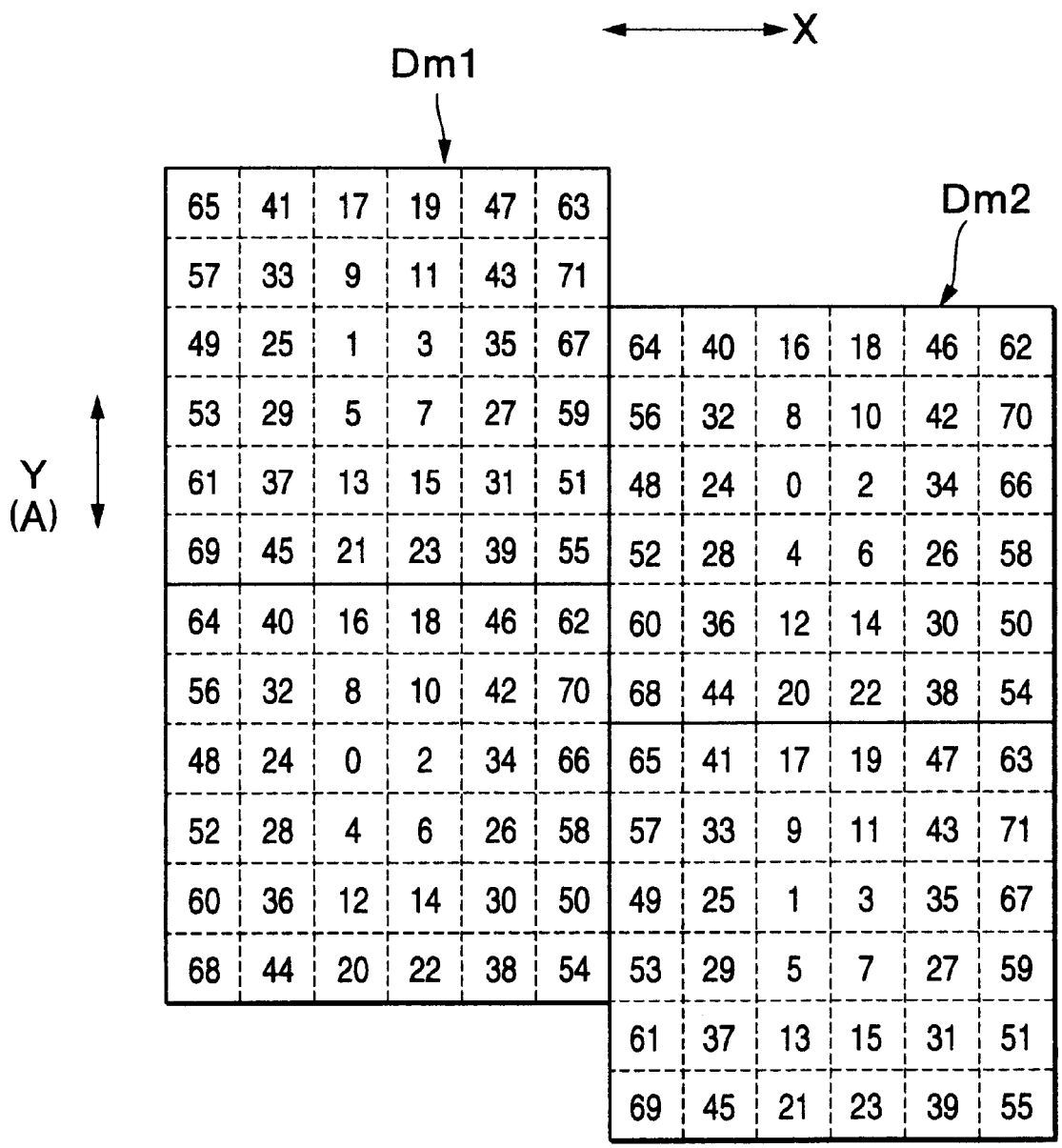
FIG. 16 illustrates another example of the dither matrices Dm1 and D2.

The dither matrices shown in FIGS. 5(a) and 7(a) of the first embodiment are merely examples showing how threshold values are arranged in a manner that dot patterns will first grow in the auxiliary scanning direction Y (sheet conveying direction A) and then will grow in the main scanning direction X. The cyan and magenta dither matrices can employ threshold value arrangements other than those shown in FIGS. 5(a) and 7(a). For example, threshold values may be arranged as shown in FIG. 16 for magenta dither matrices Dm1 and Dm2. Also in this arrangement, magenta dot pattern will first grow in the auxiliary scanning direction Y (sheet conveying direction A) and then will grow in the main scanning direction X.

In the first embodiment, threshold values, in each of the cyan dither matrices Dc1 and Dc2 of FIG. 5(a), are discretely distributed at a fixed interval of one (1) from the minimum value of "0" to the maximum value of "71" by a fixed unit of one (1). The dither matrices Dc1 and Dc2 can therefore reproduce 72 tones, in total.

Figure 17:
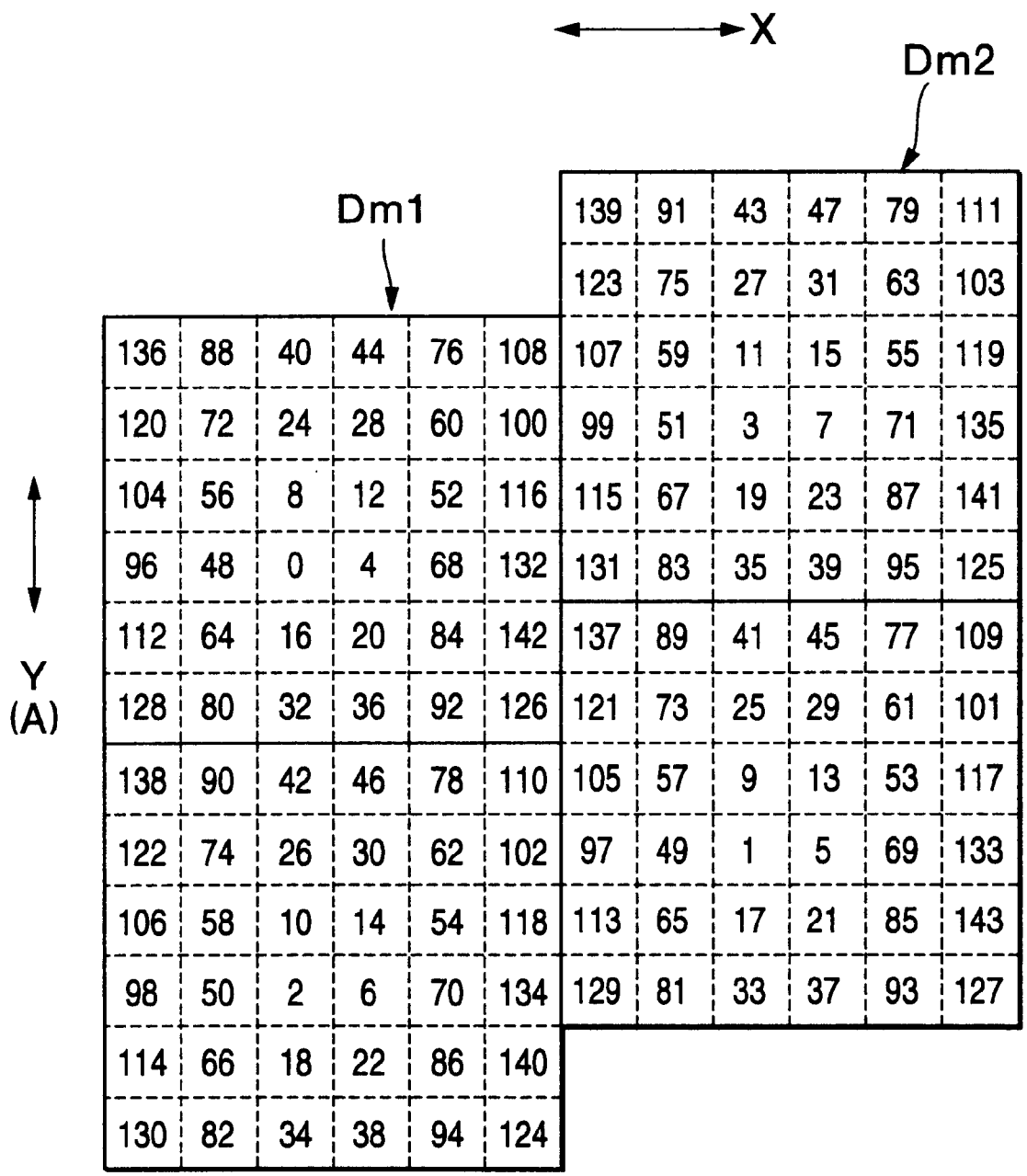
FIG. 17 illustrates an example of the dither matrices Dm1 and Dm2 according to a fourth embodiment.

However, threshold values may be arranged in the dither matrices in other fashions. For example, as shown in FIG. 17, threshold values may be arranged in the dither matrix Dc1 so that the threshold values be discretely distributed at a fixed interval of two (2) from the minimum value of "0" to the maximum value of "142". Threshold values may be arranged in the other dither matrix Dc2 so that the threshold values be discretely distributed also at the fixed interval of two (2) from the minimum value of "1" to the maximum value of "143". In this case, by using both of the dither matrices Dc1 and Dc2, it is possible to reproduce 144 tones of "0" to "143", in total.

In place of using the two dither matrices Dc1 and Dc2, a set of three dither matrices Dc1, Dc2, and Dc3 may be used. Each dither matrix has a shape elongated in the auxiliary scanning direction Y (sheet conveying direction A) as shown in FIG. 5(a) and is positioned adjacent to one another in the main scanning direction X. Threshold values in the dither matrices Dc1, Dc2, and Dc3 are slightly differentiated from one another. For example, the dither matrix Dc1 may have thresholds of "0", "3", "6", . . . , which are discretely distributed from its minimum value of "0" at the interval of three (3). The dither matrix Dc2 may have thresholds of "1", "4", "7", . . . , which are discretely distributed from its minimum value of "1" also at the interval of three (3). The dither matrix Dc3 may have thresholds of "2", "5" "8", . . . , which are discretely distributed from its minimum value of "2" also at the interval of three (3). Because the dither matrices Dc1, Dc2, and Dc3 are arranged side by side along the main scanning direction X, three sets of threshold values, which are slightly different from one another, can be positioned at different positions along the main scanning direction X. When the thus-produced dither matrices Dc1, Dc2, and Dc3 are repeatedly located in the main scanning direction X, advantages similar to those obtained in the first embodiment can also be attained while reproducing a greater number of different tones.

In each dither matrix Dc1 (Dc2) of FIG. 5(a), threshold values are distributed discretely at a fixed interval of one (1) from the minimum value of zero (0) to the maximum value of "71". Similarly, in each dither matrix Dc1 (Dc2) of FIG. 17, threshold values are distributed discretely at another fixed interval of two (2) from the minimum value of zero (0) to the maximum value of 143. However, threshold values in the dither matrix may be distributed at a non-uniform, but changing interval.

For example, in order to perform gamma calibration onto input/output characteristics between an input image Density (DrawX, DrawY) and an output image OUTPUT(DrawX, DrawY), the interval, at which the threshold values are distributed, may be changed dependently on the input/output characteristic. The interval may be changed in respective density ranges based on the input/output characteristics. With this method, gamma calibration can also be attained. For example, the dither matrix Dc1 may be constructed from 72 cells to represent 128 different tones by arranging threshold values of "0", "8", "16", "22", . . . , "72", "73", "74", "75", . . . , "100", "106", "114", and "127". In this case, the interval, at which the threshold values are discretely distributed from the minimum value of "0" to the maximum value "127", is adjusted in correspondence with the input/output characteristic. That is, the interval, at which the threshold values are distributed in low and high density ranges, is set to a great value. The interval, at which the threshold values are distributed in the middle density range, is set to a smaller value. The dither matrix having the threshold values in this manner can obtain a gamma calibration effect. It is noted that the interval, at which the threshold values are discretely distributed from the minimum value to the maximum value, can be adjusted in other manners in correspondence with the input/output characteristic.

While the invention has been described in detail with reference to the specific embodiments thereof, it would be apparent to those skilled in the art that various changes and modifications may be made therein without departing from the spirit of the invention, the scope of which is defined by the attached claims.

For example, in the above-described embodiments, the dither matrix Dc2 is prepared as shown in FIG. 5(a) by changing the positions of the submatrices SM(E) and SM(O) of the dither matrix Dc1 with each other. However, the dither matrix Dc2 can be prepared by inverting either or both of the submatrices SM(E) and SM(O) of the dither matrix Dc1, with respect to the central axis of the dither matrix Dc1, that extends parallel to the auxiliary scanning direction Y. Or, the dither matrix Dc2 may be prepared by inverting the submatrices SM(E) and SM(O) of the dither matrix Dc1, with respect to the other central axis of the dither matrix Dc1, that extends parallel to the main scanning direction X. Or, the dither matrix Dc2 can be prepared by subjecting the dither matrix Dc1 to the above-described inversions both in the auxiliary scanning direction Y and in the main scanning direction X. According to the dither matrix Dc2 produced in either manner described above, the dot pattern will first grow in the auxiliary scanning direction Y (sheet conveying direction A).

The present invention can be applied to a monochromatic printer. In this case, the cyan dither matrices or the magenta dither matrices are preferably used to minimize the jitter problem.

A well-known printer driver, which is executed in the personal computer 100 or the like to generate output data and control code data for a printer, may be used to produce output data OUTPUT(DrawX, DrawY) for each color using the above-described dither matrix. The thus prepared output data OUTPUT(DrawX, DrawY) is supplied to the printer such as the laser printer 1. In this case, the engine controller 35 in the laser printer 1 can immediately perform a printing operation to print dot images on the sheet of paper.

For example, data of the program of FIG. 15 may be initially stored in a data recording medium 200 (FIG. 3) such as a floppy disk, a magnetooptical disk, a CD-ROM, or a hard disk, from which data can be retrieved by the computer system 100. Data of the program is loaded to the computer system and is executed. Or, data of the program may be stored in a ROM or a backup RAM. The ROM or the backup RAM is installed in the computer system 100.

Or, the ROM 69 may not be stored with data of the program of FIG. 15. Instead, as indicated by dotted line in FIG. 3, the video controller 31 of the printer 1 may be provided with a driver 300 for the data recording medium 200 such as a floppy disk, a magnetooptical disk, a CD-ROM, or a hard disk, The program of FIG. 15 may be retrieved by the driver 300 from the data recording medium 200 to the RAM 67, and executed by the CPU 71.

According to the first embodiment, in the process S50 of the image forming process in FIG. 15, a dot is selectively turned on at each dot location (DrawX, DrawY) when an input density value "Density(DrawX, DrawY)" for that dot location is higher than a threshold value DithArray[X][Y] on a corresponding cell location (X, Y). However, the process of S50 may be modified to selectively turn ON a dot on each dot location when an input density value of the subject dot location is lower than the threshold value of the corresponding cell location.

What is claimed is:

1. A method for forming an image, comprising the steps of:
receiving an input image density value for each of a plurality of pixel positions, the plurality of pixel positions being defined two-dimensionally in first and second predetermined directions which are perpendicular to each other; and
converting the input image density value for each pixel position into output data for indicating whether to turn ON or OFF a pixel dot on the corresponding pixel position, by repeatedly locating a dither matrix along the first and second predetermined directions, the dither matrix including a plurality of threshold values which are arranged two-dimensionally in the first and second predetermined directions in a manner that pixel dots will be turned ON in a predetermined order when the input image density value changes uniformly successively, the predetermined order being defined so that as the input image density gradually increases, a linear pattern is first generated to extend parallel to the first direction and then grows in both of opposite two directions along the second direction, comparing the input image density value at each pixel position with a threshold value at a corresponding location of the dither matrix, and producing, based on the compared result, the output data for each pixel location.

2. A method as claimed in claim 1, further comprising the step of selectively forming, based on the output data, a pixel dot at each pixel position on an image recording medium, while conveying the image recording medium in the first predetermined direction.

3. A method as claimed in claim 2, wherein the plurality of threshold values are arranged in the dither matrix so that the amount of the threshold value will increase first in the first predetermined direction, and then increase in both of the opposite two directions along the second predetermined direction.

4. A method as claimed in claim 2, wherein the dither matrix has a length in the first direction and a width in the second direction, the length being greater than the width.

5. A method as claimed in claim 2, wherein the predetermined order is defined to turn ON a first pair of dots, after completely producing the linear pattern over an entire length of the dither matrix in the first direction, so that one dot in the first pair of dots is located on one side of the linear pattern along the second direction and the other dot is located on the other side of the linear pattern and so that a line connecting the first pair of dots will form a predetermined angle with respect to the second direction, the predetermined angle being substantially equal to an angle that is formed between the second direction and a direction, in which the dither matrix is repeatedly located along the second direction.

6. A method as claimed in claim 5, wherein the dither matrix has a predetermined region and a pair of outside regions, the predetermined region being located in the center of the dither matrix in the second direction and extending in the first direction, the pair of outside regions being located on opposite sides of the predetermined region in the second direction, wherein the threshold values are arranged in the dither matrix in the predetermined order so that the threshold values, of a predetermined minimum value to a first predetermined middle value greater than the predetermined minimum value, are allocated one by one in the predetermined region, and then the threshold values of second and third predetermined middle values that are greater than the first predetermined middle value are allocated one by one at a pair of locations that are positioned in the pair of outside regions, respectively, the line connecting the second and third predetermined middle values forming the predetermined angle with respect to the second predetermined direction.

7. A method as claimed in claim 2,
wherein the receiving step receives an input image density value indicative of a density value, for each of cyan and magenta color components, of a color image desired to be produced,
wherein the converting step repeatedly locates, in the first and second predetermined directions, the dither matrix for each of a cyan color component and a magenta color component, the dither matrix for each color component being for determining dots to be turned ON, whose number corresponds to an input image density value of the each color component, the dither matrix for each color component having a plurality of threshold values which are arranged according to the predetermined order in the first and second directions, a position where a dot is to be first turned ON according to the cyan dither matrix along the second direction being different from a position where a dot is to be first turned ON according to the magenta dither matrix in the second direction, the converting step comparing, at each pixel position, the input image density value for each color component with a threshold value at a corresponding location in the corresponding color dither matrix, and producing, based on the compared result, output data for selectively turning ON and OFF each pixel dot for the corresponding color, and wherein the pixel dot forming step selectively forms, based on the output data, a pixel dot of each color component at each pixel position on the image recording medium while conveying the image recording medium the first direction.

8. A method an claimed in claim 7, wherein the dither matrix for each color component is repeatedly located along the second direction so that a position where the smallest threshold value in the cyan dither matrix is located along the second direction be different from a position where the smallest threshold value in the magenta dither matrix is located in the second direction.

9. A method as claimed in claim 8, wherein the receiving step receives an input image density value indicative of a density value, for each of cyan, magenta, and yellow color components, of the color image desired to be produced, wherein the converting step repeatedly locates, in the first and second predetermined directions, the dither matrix for each color component, the dither matrix for yellow color component having a plurality of threshold values arranged in the first and second directions, comparing, at each pixel position, an input image density value of each color component with a threshold value at a corresponding location in the corresponding color dither matrix, and producing, based on the compared result, output data for selectively turning ON and OFF each pixel dot for each color component, and wherein the pixel dot forming step selectively forms, based on the output data, pixel dot of each color at each pixel position on the image recording medium while conveying the image recording medium in the first direction.

10. A method as claimed in claim 9, wherein the converting step includes the steps of:

repeatedly locating, on a two-dimensional plane defined by the first and second directions to arrange the plurality of pixel positions, the cyan dither matrix along a direction that is shifted from the second direction by a predetermined angle, and comparing, at each pixel position, the input cyan image density value with the threshold value at the corresponding location of the cyan dither matrix; and repeatedly locating, on the two-dimensional plane, the magenta dither matrix in another direction that is shifted from the second direction by another predetermined angle, and comparing, at each pixel position, the input magenta image density value with the threshold value at the corresponding location of the magenta dither matrix.

11. A method as claimed in claim 9, wherein a position where a dot is to be first turned ON according to the yellow dither matrix in the second direction is different from positions where dots are to be first turned ON according to the cyan and magenta dither matrices in the second direction.

12. A method claimed in claim 11 wherein a position where the smallest threshold value in the yellow dither matrix is located in the second direction is different from positions where the smallest threshold values in the cyan and magenta dither matrices are located in the second direction.

13. A method as claimed in claim 12, wherein the dither matrices for cyan, magenta, and yellow colors are repeatedly located in the second direction in a periodic manner so that a position where the smallest threshold value in the yellow dither matrix is located in the second direction is different from positions where the smallest threshold values in the cyan and magenta dither matrices are located in the second direction.

14. A method as claimed in claim 7, wherein a position where a dot is to be first turned ON according to the cyan dither matrix in the first direction is different from a position where a dot is to be first turned ON according to the magenta dither matrix in the first direction.

15. A method as claimed in claim 14, wherein a position where the smallest threshold value in the cyan dither matrix is located in the first direction is different from a position where the smallest threshold value in the magenta dither matrix is located in the first direction.

16. A method as claimed in claim 2, wherein the receiving step receives an input image density value indicative of a density value, for each of cyan and magenta color components, of a color image desired to be produced, wherein the converting step repeatedly locates, in the first and second predetermined directions, the dither matrix for each of a cyan color component and a magenta color component, the dither matrix for each color component being for determining dots to be turned ON, whose number corresponds to an input image density value of the each color component, the dither matrix for each color component having a plurality of threshold values which are arranged according to the predetermined order in the first and second directions, a position where a dot is to be first turned ON according to the cyan dither matrix along the first direction being different from a position where a dot is to be first turned ON according to the magenta dither matrix in the first direction, the converting step comparing, at each pixel position, the input image density value for each color component with a threshold value at a corresponding location in the corresponding color dither matrix, and producing, based on the compared result, output data for selectively turning ON and OFF each pixel dot for the corresponding color, and wherein the pixel dot forming step selectively forms, based on the output data, a pixel dot of each color component at each pixel position on the image recording medium while conveying the image recording medium in the first direction.

17. A method as claimed in claim 16, wherein the dither matrix for each color component is repeatedly located along the first direction so that a position where the smallest threshold value in the cyan dither matrix is located along the first direction be different from a position where the smallest threshold value in the magenta dither matrix is located in the first direction.

18. A method as claimed in claim 1, wherein the linear pattern first grows in both of opposite two directions along the first direction thereby extending parallel to the first direction, and then grows in both of the opposite two directions along the second direction.

19. A method as claimed in claim 18, wherein the plurality of threshold values are arranged in the dither matrix so that the amount of the threshold value will increase first in both of the opposite two directions along the first predetermined direction, and then increase in both of the opposite two directions along the second direction while increasing in both of the opposite two directions along the first direction.

20. A method as claimed in claim 1, wherein the dither matrix has a predetermined region and a pair of outside regions, the predetermined region being located in the center of the dither matrix in the second direction, the predetermined region having a plurality of columns, each column extending in the first direction, the pair of outside regions being located on opposite sides of the predetermined region in the second direction, wherein the threshold values are arranged in the dither matrix in the predetermined order so that the threshold values, of a predetermined minimum value to a first predetermined middle value greater than the predetermined minimum value, are allocated one by one in the predetermined region, and then threshold values greater than the first predetermined middle value are allocated one by one in the pair of outside regions in alternation.

21. A method as claimed in claim 20, wherein the threshold values of the minimum value to the first middle value are arranged in the predetermined region so that the amount of the threshold value will increase in both of the opposite two directions along the first predetermined direction, and the threshold values greater than the first middle value are arranged in the pair of outside regions so that the amount of the threshold value will increase in both of the opposite two directions along the second predetermined direction while increasing in both of the opposite two directions along the first predetermined direction.

22. An image forming device for forming an image, comprising:
    means for receiving an input image density value for each of a plurality of pixel positions, the plurality of pixel positions being defined two-dimensionally in first and second predetermined directions which are perpendicular to each other; and
    means for converting the input image density value for each pixel position into output data for indicating whether to turn ON or OFF a pixel dot on the corresponding pixel position, by repeatedly locating a dither matrix along the first and second predetermined directions, the dither matrix including a plurality of threshold values which are arranged two-dimensionally in the first and second predetermined directions in a manner that pixel dots will be turned ON in a predetermined order when the input image density value changes uniformly successively, the predetermined order being defined so that as the input image density gradually increases, a linear pattern is first generated to extend parallel to the first direction and then grows in both of opposite two directions along the second direction, comparing the input image density value at each pixel position with a threshold value at a corresponding location of the dither matrix, and producing, based on the compared result, the output data for each pixel location.

23. An image forming device as claimed in claim 22, further comprising means for selectively forming, based on the output data, a pixel dot at each pixel position on an image recording medium, while conveying the image recording medium in the first predetermined direction.

24. An image forming device as claimed in claim 23, wherein the plurality of threshold values are arranged in the dither matrix so that the amount of the threshold value will increase first in the first predetermined direction, and then increase in both of the opposite two directions along the second predetermined direction.

25. An image forming device as claimed in claim 23, wherein the dither matrix has a length in the first direction and a width in the second direction, the length being greater than the width.

26. An image forming device as claimed in claim 23, wherein the predetermined order is defined to turn ON a first pair of dots, after completely producing the linear pattern over an entire length of the dither matrix in the first direction, so that one dot in the first pair of dots is located on one side of the linear pattern along the second direction and the other dot is located on the other side of the linear pattern and so that a line connecting the first pair of dots will form a predetermined angle with respect to the second direction, the predetermined angle being substantially equal to an angle that is formed between the second direction and a direction, in which the dither matrix is repeatedly located along the second direction.

27. An image forming device as claimed in claim 26, wherein the dither matrix has a predetermined region and a pair of outside regions, the predetermined region being located in the center of the dither matrix in the second direction and extending in the first direction, the pair of outside regions being located on opposite sides of the predetermined region in the second direction, wherein the threshold values are arranged in the dither matrix in the predetermined order so that the threshold values, of a predetermined minimum value to a first predetermined middle value greater than the predetermined minimum value, are allocated one by one in the predetermined region, and then the threshold values of second and third predetermined middle values that are greater than the first predetermined middle value are allocated one by one at a pair of locations that are positioned in the pair of outside regions, respectively, the line connecting the second and third predetermined middle values forming the predetermined angle with respect to the second predetermined direction.

28. An image forming device as claimed in claim 23, wherein the receiving means receives an input image density value indicative of a density value, for each of cyan, magenta, and yellow color components, of the color image desired to be produced,
    wherein the converting means repeatedly locates, in the first and second predetermined directions, the dither matrix for each color component, the dither matrix for yellow color component having a plurality of threshold values arranged in the first and second directions, comparing, at each pixel position, an input image density value of each color component with a threshold value at a corresponding location in the corresponding color dither matrix, and producing, based on the compared result, output data for selectively turning ON and OFF each pixel dot for each color component, and
    wherein the pixel dot forming means selectively forms, based on the output data, pixel dot of each color at each pixel position on the image recording medium while conveying the image recording medium in the first direction.

29. An image forming device as claimed in claim 28, wherein the converting means includes:
    means for repeatedly locating, on a two-dimensional plane defined by the first and second directions to arrange the plurality of pixel positions, the cyan dither matrix along a direction that is shifted from the second direction by a predetermined angle, and comparing, at each pixel position, the input cyan image density value with the threshold value at the corresponding location of the cyan dither matrix; and means for repeatedly locating, on the two-dimensional plane, the magenta dither matrix in another direction that is shifted from the second direction by another predetermined angle, and comparing, at each pixel position, the input magenta image density value with the threshold value at the corresponding location of the magenta dither matrix.

30. An image forming device as claimed in claim 28, wherein a position where a dot is to be first turned ON according to the cyan dither matrix in the first direction is different from a position where a dot is to be first turned ON according to the magenta dither matrix in the first direction.

31. An image forming device as claimed in claim 30, wherein a position where the smallest threshold value in the cyan dither matrix is located in the first direction is different from a position where the smallest threshold value in the magenta dither matrix is located in the first direction.

32. An image forming device as claimed in claim 28, wherein a position where a dot is to be first turned ON according to the yellow dither matrix in the second direction is different from positions where dots are to be first turned ON according to the cyan and magenta dither matrices in the second direction.

33. An image forming device as claimed in claim 32, wherein a position where the smallest threshold value in the yellow dither matrix is located in the second direction is different from positions where the smallest threshold values in the cyan and magenta dither matrices are located in the second direction.

34. An image forming device as claimed in claim 33, wherein the dither matrices for cyan, magenta, and yellow colors are repeatedly located in the second direction in a periodic manner so that a position where the smallest threshold value in the yellow dither matrix is located in the second direction is different from positions where the smallest threshold values in the cyan and magenta dither matrices are located in the second direction.

35. An image forming device as claimed in claim 23, wherein the receiving means receives an input image density value indicative of a density value, for each of cyan and magenta color components, of a color image desired to be produced, wherein the converting means repeatedly locates, in the first and second predetermined directions, the dither matrix for each of a cyan color component and a magenta color component, the dither matrix for each color component being for determining dots to be turned ON, whose number corresponds to an input image density value of the each color component, the dither matrix for each color component having a plurality of threshold values which are arranged accordingly to the predetermined order in the first and second directions, a position where a dot is to be first turned ON according to the cyan dither matrix along the second direction being different from a position where a dot is to be first turned ON according to the magenta dither matrix in the second direction, the converting means comparing, at each pixel position, the input image density value for each color component with a threshold value at a corresponding location in the corresponding color dither matrix, and producing, based on the compared result, output data for selectively turning ON and OFF each pixel dot for the corresponding color, and wherein the pixel dot forming means selectively forms, based on the output data, a pixel dot of each color component at each pixel position on the image recording medium while conveying the image recording medium in the first direction.

36. An image forming device as claimed in claim 35, wherein the dither matrix for each color component is repeatedly located along the second direction so that a position where the smallest threshold value in the cyan dither matrix is located along the second direction be different from a position where the smallest threshold value in the magenta dither matrix is located in the second direction.

37. An image forming device as claimed in claim 35, wherein a position where a dot is to be first turned ON according to the cyan dither matrix in the first direction is different from a position where a dot is to be first turned ON according to the magenta dither matrix in the first direction.

38. An image forming device as claimed in claim 37, wherein a position where the smallest threshold value in the cyan dither matrix is located in the first direction is different from a position where the smallest threshold value in the magenta dither matrix is located in the first direction.

39. An image forming device as claimed in claim 23, wherein the receiving means receives an input image density value indicative of a density value, for each of cyan and magenta color components, of a color image desired to be produced, wherein the converting means repeatedly locates, in the first and second predetermined directions, the dither matrix for each of a cyan color component and a magenta color component, the dither matrix for each color component being for determining dots to be turned ON, whose number corresponds to an input image density value of the each color component, the dither matrix for each color component having a plurality of threshold values which are arranged according to the predetermined order in the first and second directions, a position where a dot is to be first turned ON according to the cyan dither matrix along the first direction being different from a position where a dot is to be first turned ON according to the magenta dither matrix in the first direction, the converting means comparing, at each pixel position, the input image density value for each color component with a threshold value at a corresponding location in the corresponding color dither matrix, and producing, based on the compared result, output data for selectively turning ON and OFF each pixel dot for the corresponding color, and wherein the pixel dot forming means selectively forms, based on the output data, a pixel dot of each color component at each pixel position on the image recording medium while conveying the image recording medium in the first direction.

40. An image forming device as claimed in claim 39, wherein the dither matrix for each color component is repeatedly located along the first direction so that a position where the smallest threshold value in the cyan dither matrix is located along the first direction be different from a position where the smallest threshold value in the magenta dither matrix is located in the first direction.

41. An image forming device as claimed in claim 22, wherein the linear pattern first grows in both of opposite two directions along the first direction thereby extending parallel to the first direction, and then grows in both of the opposite two directions along the second direction.

42. An image forming device as claimed in claim 41, wherein the plurality of threshold values are arranged in the dither matrix so that the amount of the threshold value will increase first in both of the opposite two directions along the first predetermined direction, and then increase in both of the opposite two directions along the second direction while increasing in both of the opposite two directions along the first direction.

43. An image forming device as claimed in claim 22, wherein the dither matrix has a predetermined region and a pair of outside regions, the predetermined region being located in the center of the dither matrix in the second direction, the predetermined region having a plurality of columns, each column extending in the first direction, the pair of outside regions being located on opposite sides of the predetermined region in the second direction, wherein the threshold values are arranged in the dither matrix in the predetermined order so that the threshold values, of a predetermined minimum value to a first predetermined middle value greater than the predetermined minimum value, are allocated one by one in the predetermined region, and then threshold values greater than the first predetermined middle value are allocated one by one in the pair of outside regions in alternation.

44. An image forming device as claimed in claim 43, wherein the threshold values of the minimum value to the first middle value are arranged in the predetermined region so that the amount of the threshold value will increase in both of the opposite two directions along the first predetermined direction, and the threshold values greater than the first middle value are arranged in the pair of outside regions so that the amount of the threshold value will increase in both of the opposite two directions along the second predetermined direction while increasing in both of the opposite two directions along the first predetermined direction.

45. A data recording medium storing data of a program readable by a computer system and for controlling the computer, the program comprising:

a program for receiving an input image density value for each of a plurality of pixel positions, the plurality of pixel positions being defined two-dimensionally in first and second predetermined directions which are perpendicular to each other; and a program for converting the input image density value for each pixel position into output data for indicating whether to turn ON or OFF a pixel dot on the corresponding pixel position, by repeatedly locating a dither matrix along the first and second predetermined directions, the dither matrix including a plurality of threshold values which are arranged two-dimensionally in the first and second predetermined directions in a manner that pixel dots will be turned ON in a predetermined order when the input image density value changes uniformly successively, the predetermined order being defined so that as the input image density gradually increases, a linear pattern is first generated to extend parallel to the first direction and then grows in both of opposite two directions along the second direction, comparing the input image density value at each pixel position with a threshold value at a corresponding location of the dither matrix, and producing, based on the compared result, the output data for each pixel location.

* * * * *